United States Patent
Asamura et al.

(10) Patent No.: US 10,326,908 B2
(45) Date of Patent: Jun. 18, 2019

(54) IMAGE READING APPARATUS AND IMAGE READING METHOD

(71) Applicant: MITSUBISHI ELECTRIC CORPORATION, Tokyo (JP)

(72) Inventors: Masako Asamura, Tokyo (JP); Satoshi Yamanaka, Tokyo (JP); Hiroyuki Kawano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/547,618

(22) PCT Filed: Feb. 25, 2016

(86) PCT No.: PCT/JP2016/055600
§ 371 (c)(1),
(2) Date: Jul. 31, 2017

(87) PCT Pub. No.: WO2016/147832
PCT Pub. Date: Sep. 22, 2016

(65) Prior Publication Data
US 2018/0013919 A1    Jan. 11, 2018

(30) Foreign Application Priority Data
Mar. 16, 2015 (JP) ................. 2015-051635

(51) Int. Cl.
*H04N 1/00* (2006.01)
*H04N 1/393* (2006.01)
(Continued)

(52) U.S. Cl.
CPC ......... *H04N 1/393* (2013.01); *H04N 1/00034* (2013.01); *H04N 1/192* (2013.01);
(Continued)

(58) Field of Classification Search
CPC ........ H04N 1/393; H04N 1/401; H04N 1/192; H04N 1/387; H04N 1/3876
See application file for complete search history.

(56) References Cited

U.S. PATENT DOCUMENTS 6,373,995 B1   4/2002 Moore
2011/0038019 A1* 2/2011 Kawano .............. H04N 1/0306
                                              358/475
(Continued)

FOREIGN PATENT DOCUMENTS

CN    101981910 A    2/2011
JP    2003-101724 A  4/2003
(Continued)

OTHER PUBLICATIONS

Office Action issued in counterpart Chinese Application No. 201680015429.5 dated Jan. 8, 2019.

*Primary Examiner* — Benjamin O Dulaney
(74) *Attorney, Agent, or Firm* — Birch, Stewart, Kolasch & Birch, LLP

(57) ABSTRACT

An image reading apparatus includes: N sensor chips arranged in a first direction and each including a plurality of image pickup elements arranged in the first direction; N optical systems that form, on the N sensor chips, reduced-size images of N reading ranges arranged in the first direction on a document; and an image processing section that uses image data of overlap regions to obtain positions of the overlap regions, obtains, based on the positions and predetermined synthesis reference positions in the overlap regions, magnifications of read images and synthesis positions, performs image processing of correcting the magnifications in the first direction of the image data of the N reading ranges, and combines the image data of the N reading ranges subjected to the image processing, thereby generating synthesized image data.

11 Claims, 17 Drawing Sheets

(51) Int. Cl.
*H04N 1/387* (2006.01)
*H04N 1/192* (2006.01)
*H04N 1/401* (2006.01)

(52) U.S. Cl.
CPC .............. *H04N 1/387* (2013.01); *H04N 1/401* (2013.01); *H04N 1/3876* (2013.01); *H04N 2201/0081* (2013.01)

(56) References Cited

U.S. PATENT DOCUMENTS

| | | | |
|---|---|---|---|
| 2011/0044555 A1* | 2/2011 | Swanson | H04N 1/3876 382/275 |
| 2012/0194636 A1* | 8/2012 | Tokunaga | H04N 1/3876 348/36 |
| 2013/0336601 A1 | 12/2013 | Fujii et al. | |
| 2016/0048946 A1* | 2/2016 | Asano | H04N 1/387 382/162 |
| 2018/0007232 A1* | 1/2018 | Yamagata | H04N 1/19 |

FOREIGN PATENT DOCUMENTS

| | | |
|---|---|---|
| JP | 2010-141558 A | 6/2010 |
| JP | 2010-206607 A | 9/2010 |
| JP | 2012-109737 A | 6/2012 |
| JP | 2013-258604 A | 12/2013 |

* cited by examiner

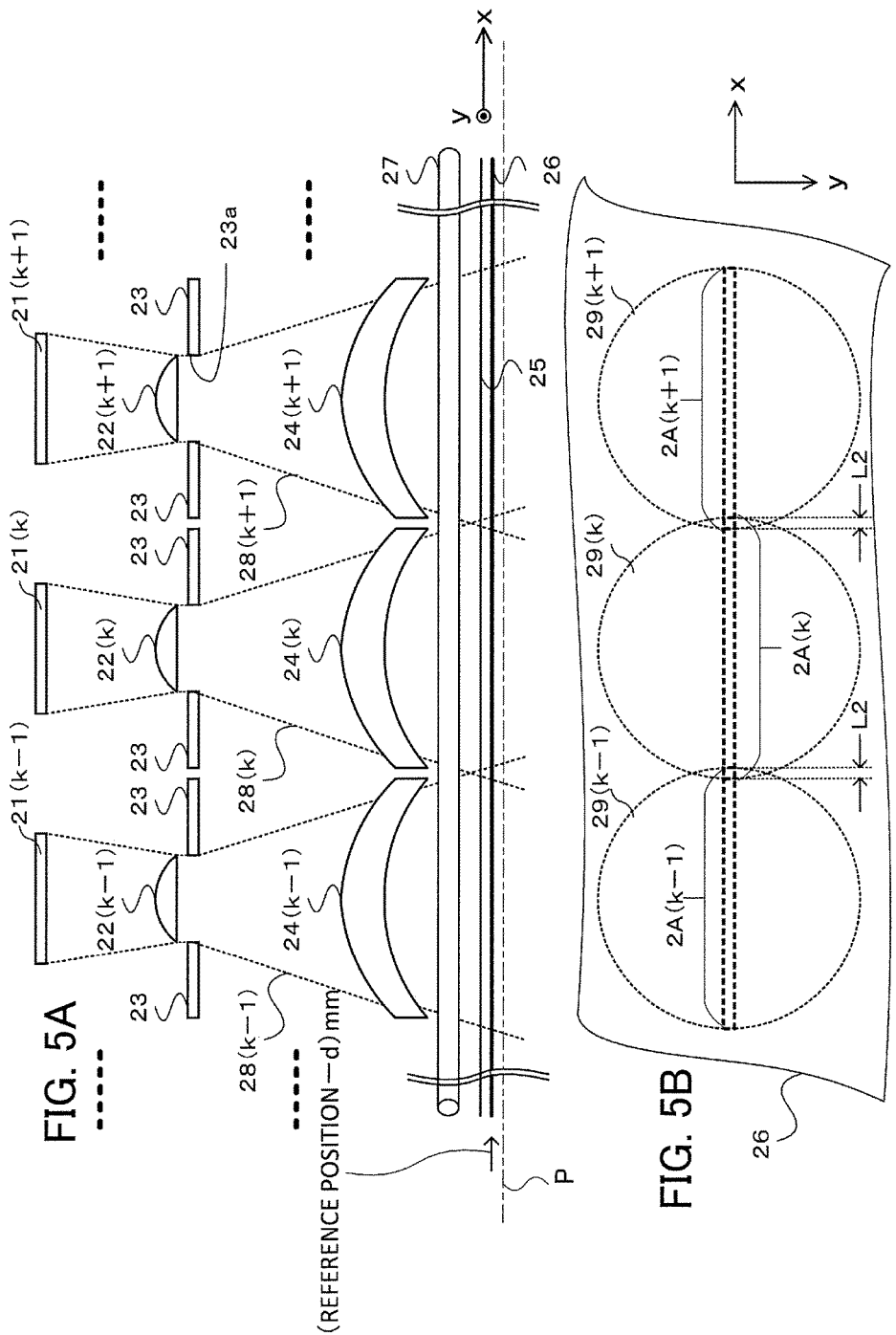

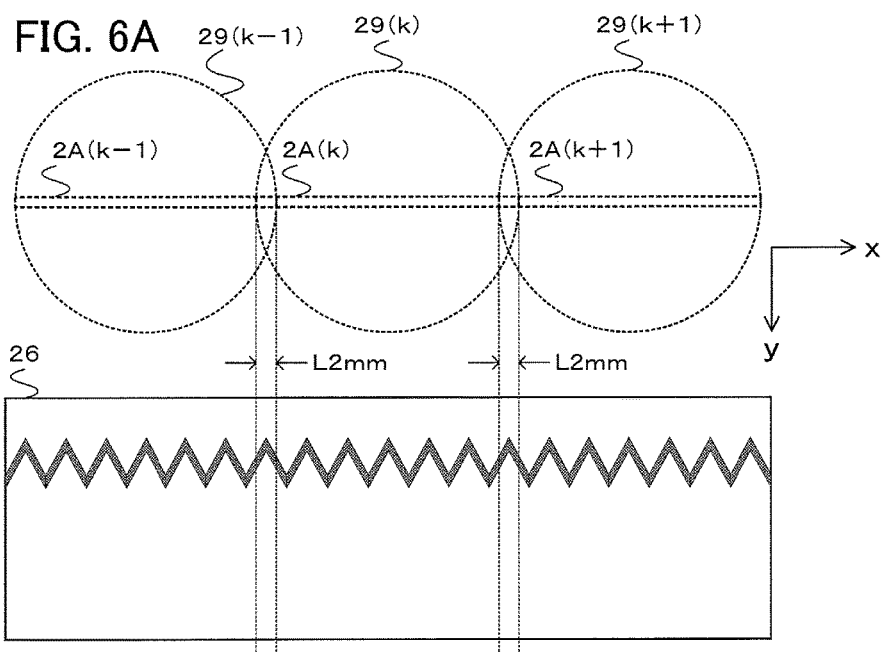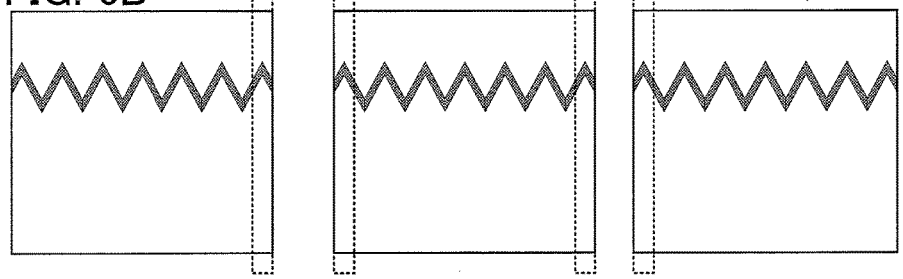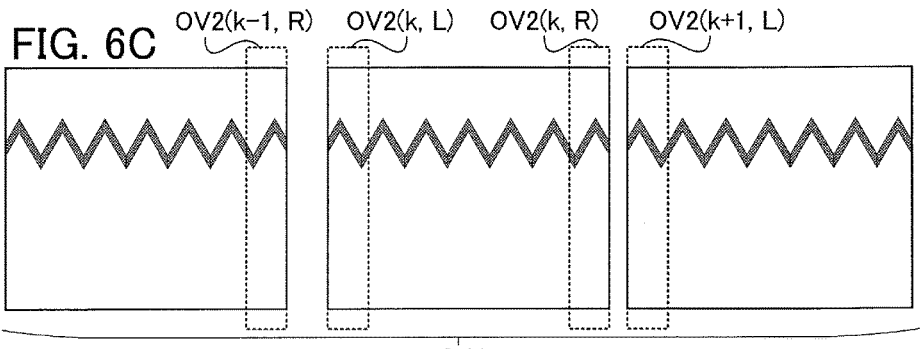

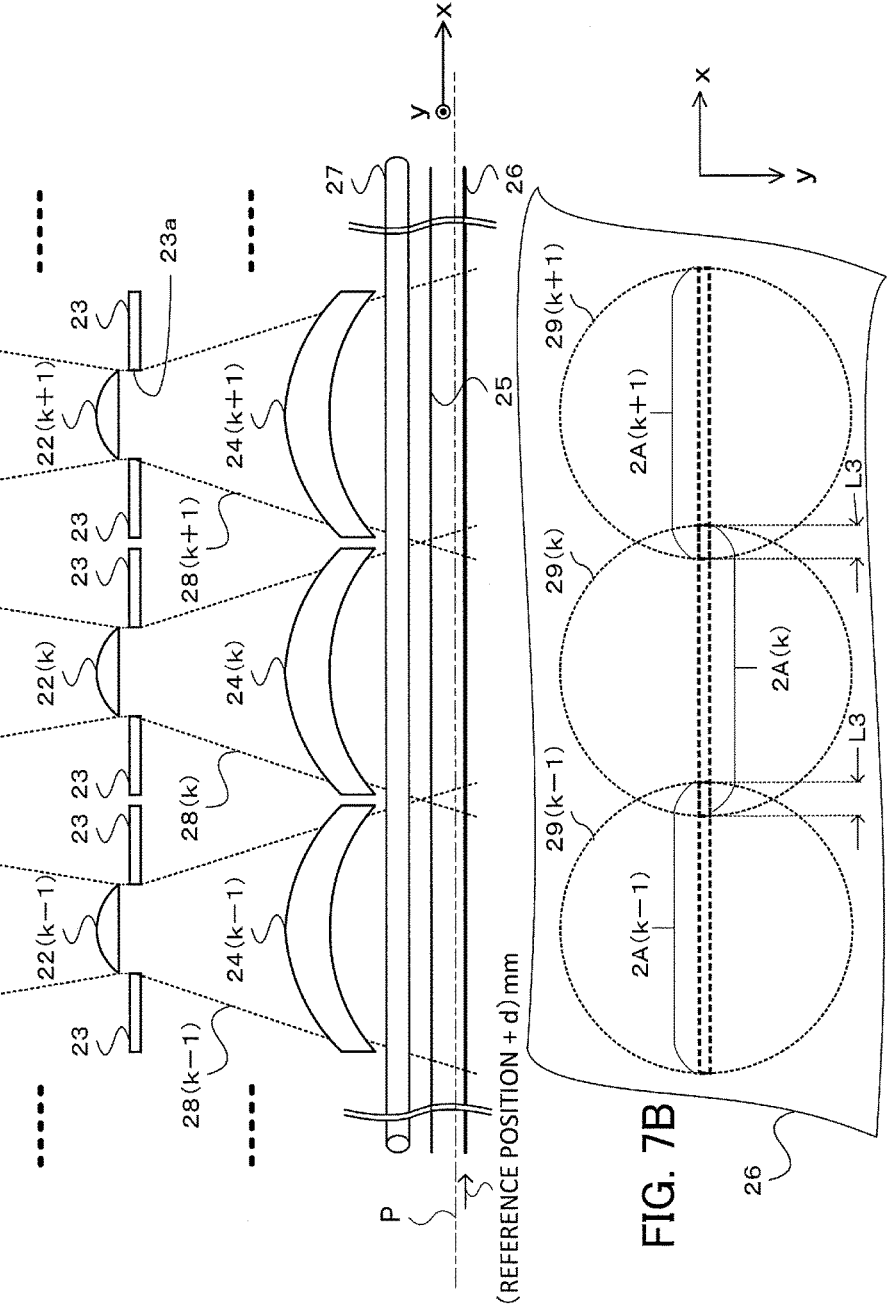

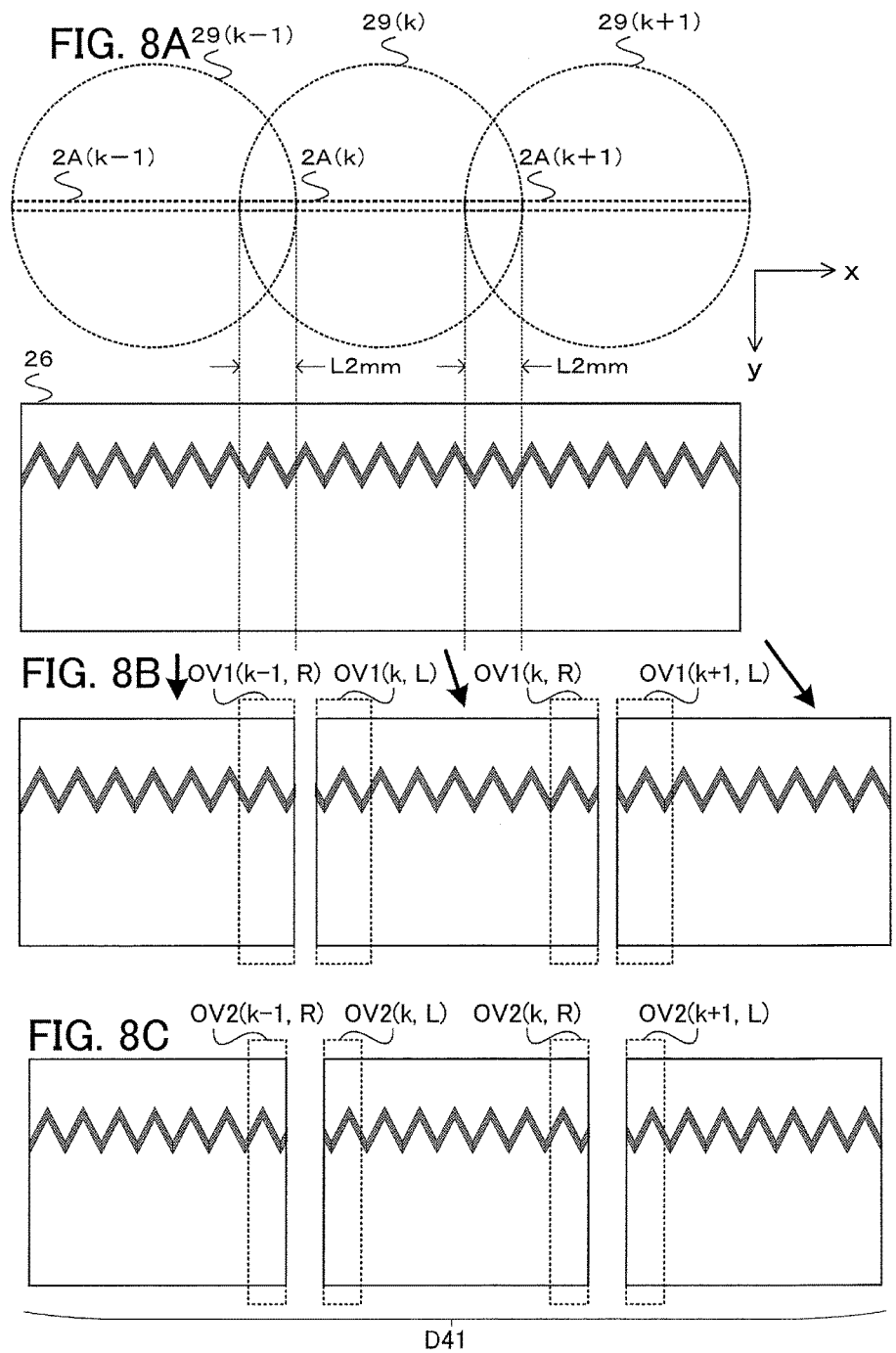

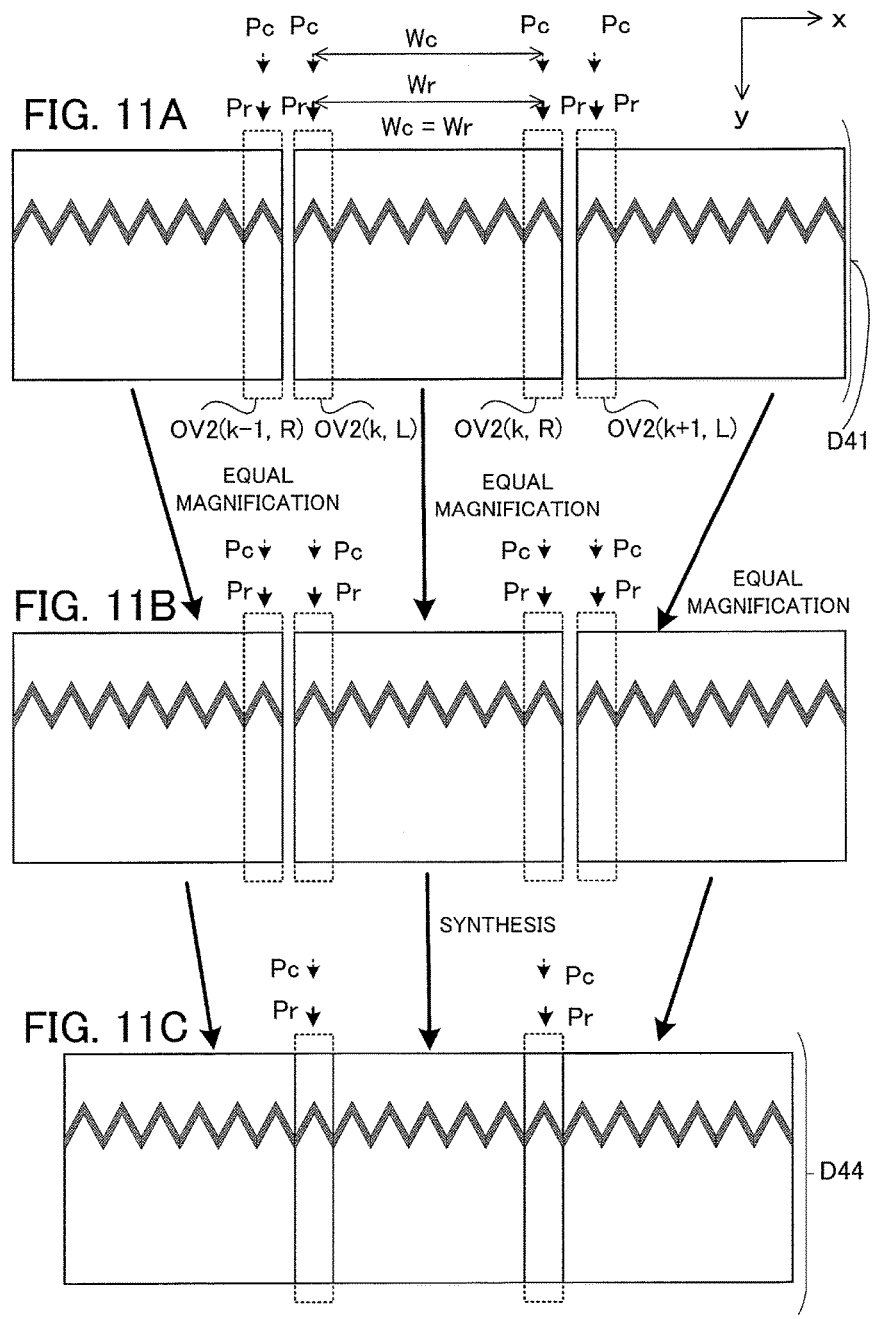

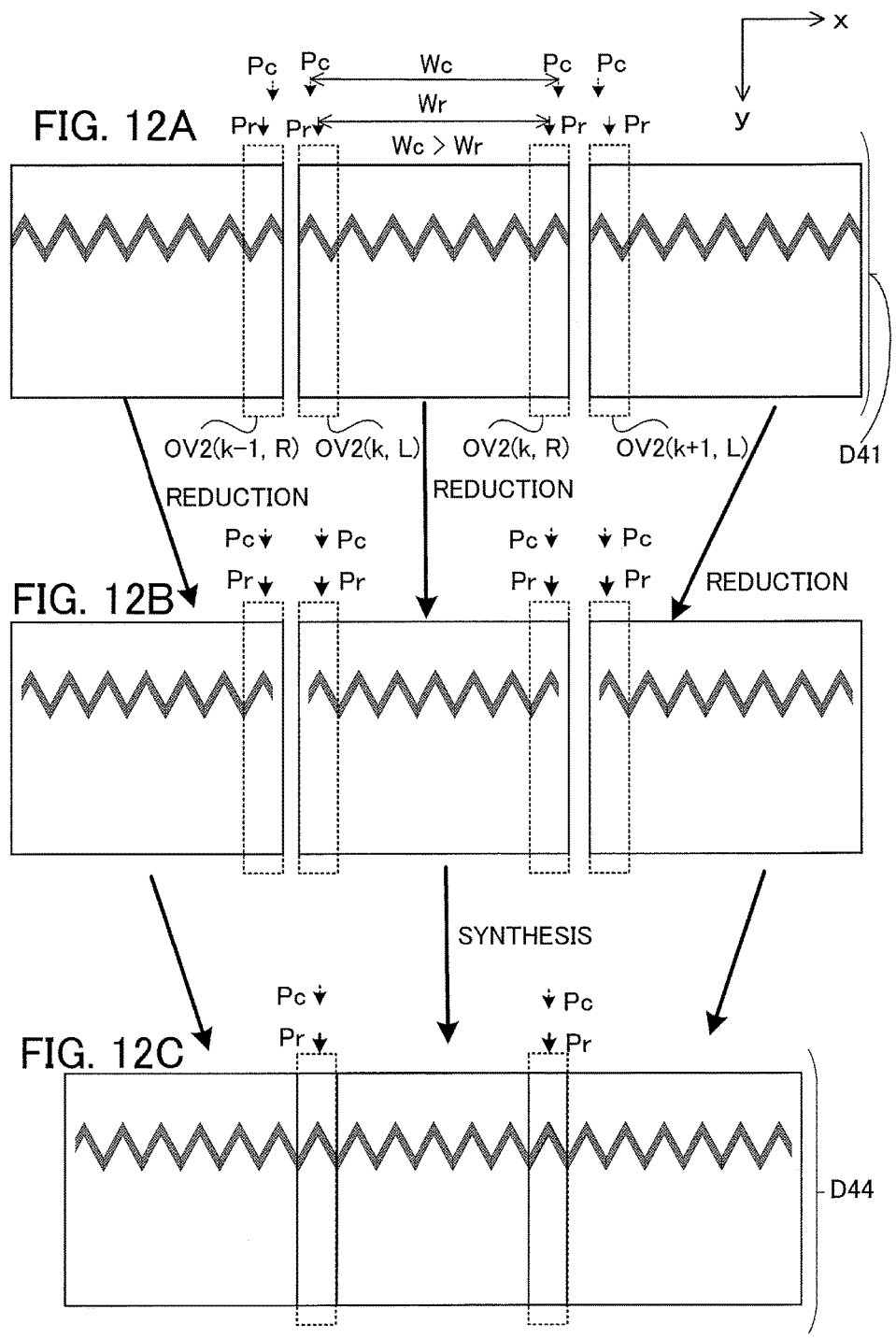

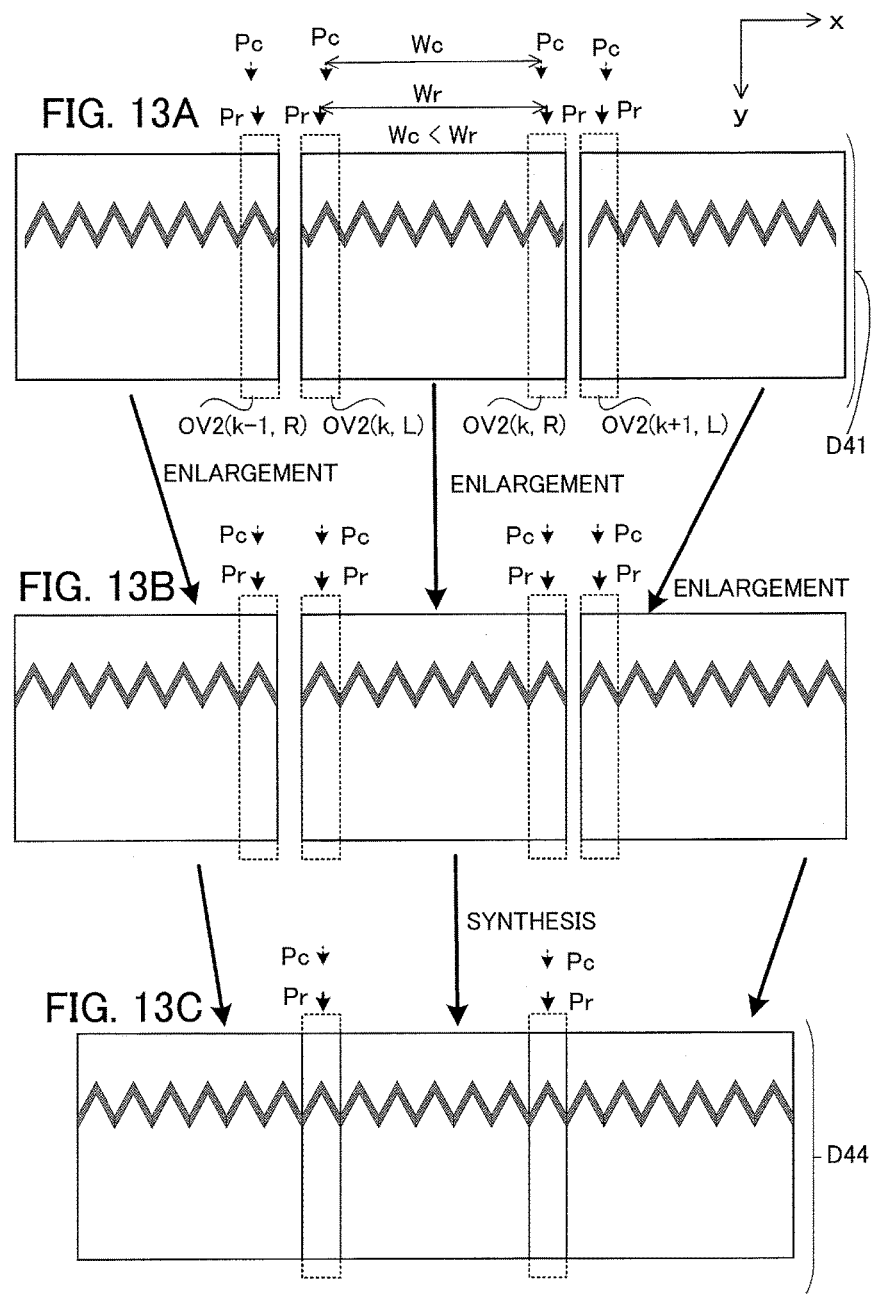

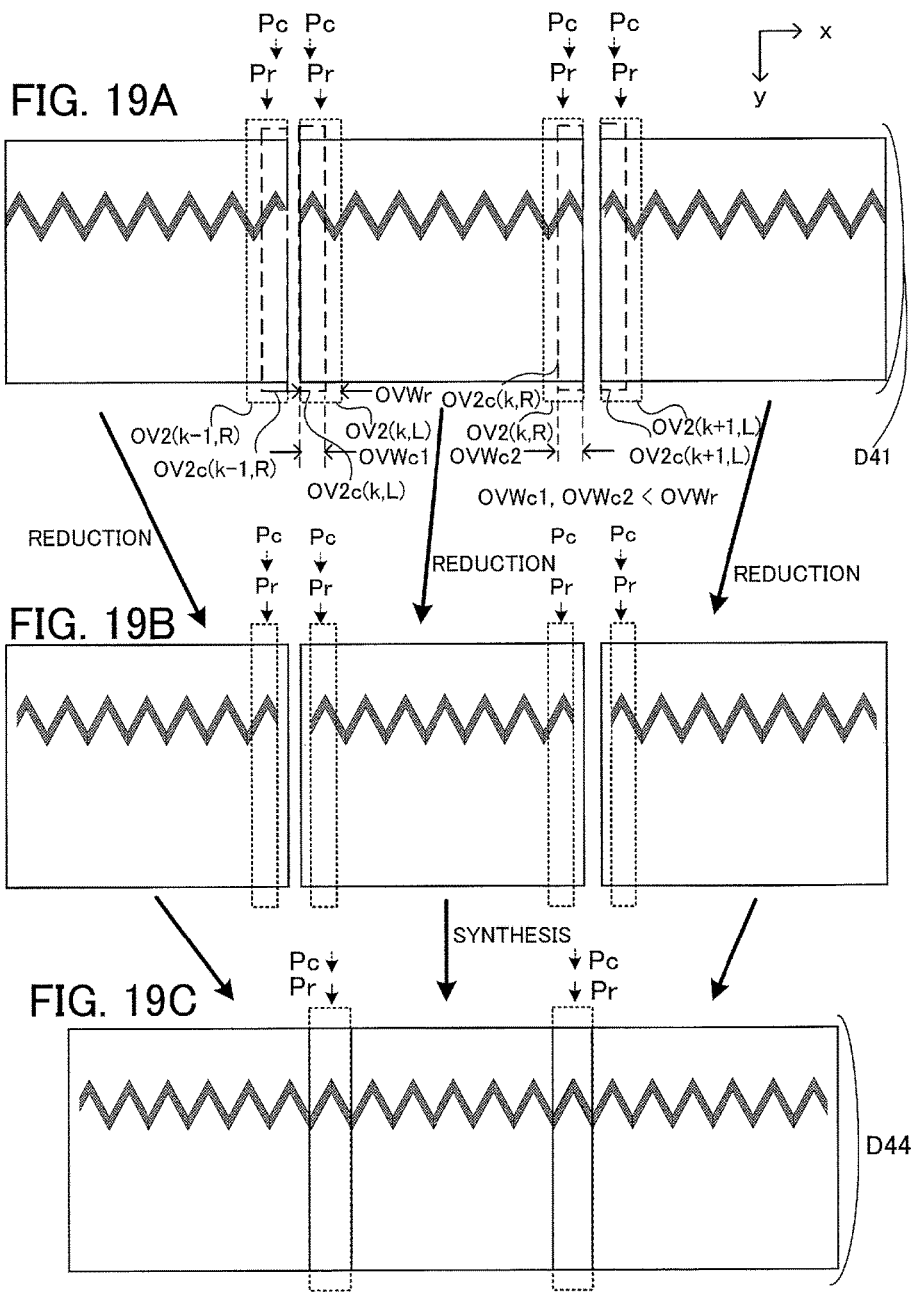

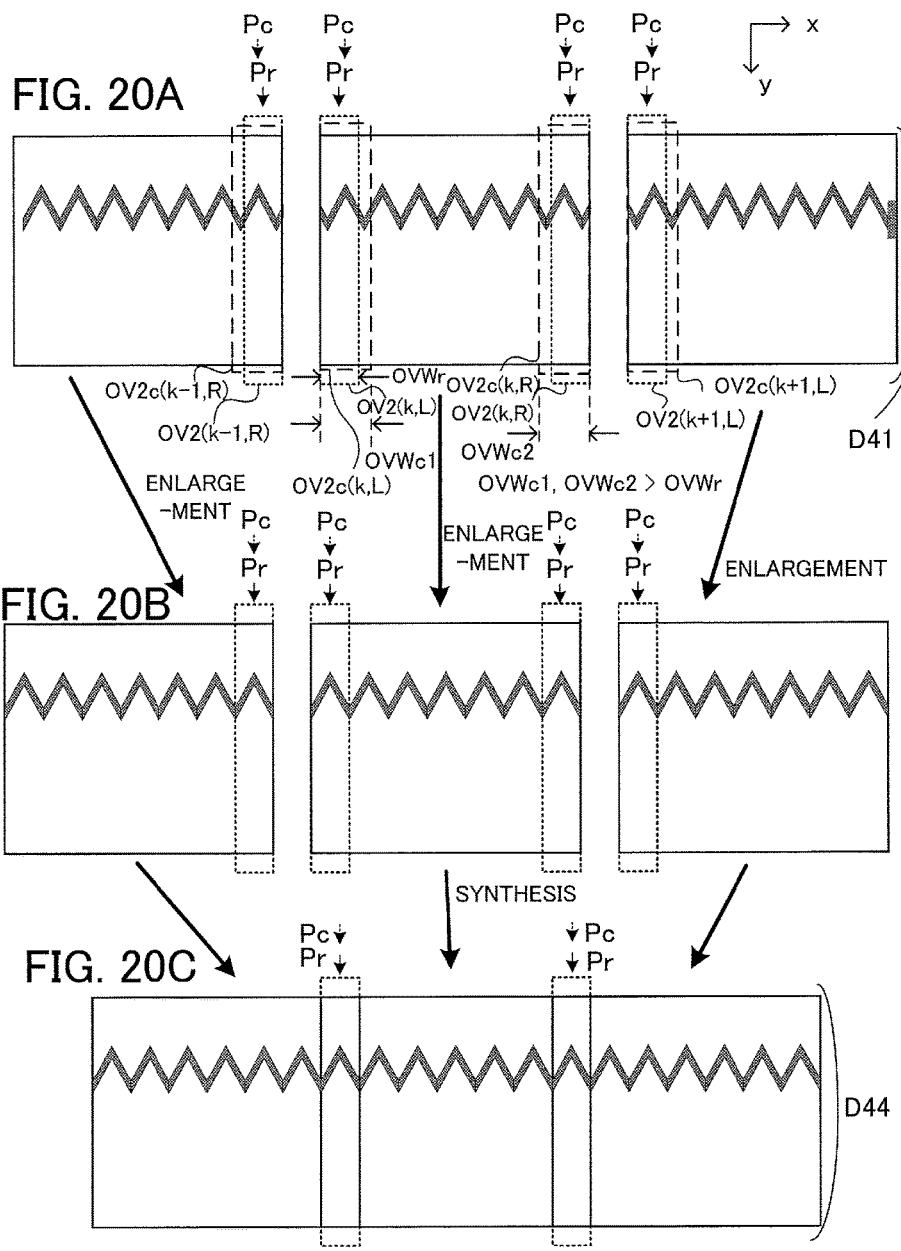

IMAGE READING APPARATUS AND IMAGE READING METHOD

TECHNICAL FIELD

The present invention relates to an image reading apparatus and an image reading method for optically scanning a document to generate image data.

BACKGROUND ART

As an image reading apparatus to be applied to a copying machine, a scanner, a facsimile, and so forth, a contact image sensor that scans a document as a reading object with a one-dimensional image pickup device (line sensor) to generate image data corresponding to the document is put into practical use. The contact image sensor includes a plurality of sensor chips arranged linearly in a main-scanning direction, and each of the plurality of sensor chips includes a plurality of image pickup elements arranged linearly in the main-scanning direction at a predetermined arrangement pitch. However, since no image pickup element is disposed between adjacent sensor chips of the plurality of sensor chips, if the arrangement pitch of the image pickup elements is small, there arises a problem in which a loss of data corresponding to a position between the adjacent sensor chips is conspicuous and quality of a read image is degraded.

As a countermeasure for this, proposed is an apparatus in which a plurality of sensor chips are linearly arranged so that the arrangement pitch of image pickup elements between the adjacent sensor chips is twice as large as the arrangement pitch of image pickup elements in each of the sensor chips, and a loss of data in a position between the adjacent sensor chips is interpolated by signal processing (e.g., see Patent Document 1). Patent Document 1 describes an apparatus using, as interpolation data, an average value of data of two pixels at both sides of a data loss position corresponding to the position between the adjacent sensor chips, and also describes an apparatus using, as interpolation data, a value obtained from a calculation made by using a quartic approximate curve derived from data of two pixels at each side (i.e., four pixels in total) of the data loss position corresponding to the adjacent sensor chips.

PRIOR ART REFERENCE

Patent Reference

Patent Document 1: Japanese Patent Application Publication No. 2003-101724 (paragraphs 0039 to 0067 and FIGS. 3 to 5)

SUMMARY OF THE INVENTION

Problem to be Solved by the Invention

The apparatus described in Patent Document 1, however, has a problem in which an accurate image at the data loss position cannot be reproduced if image information having high frequency components is present at a position on a document corresponding to the data loss position between the adjacent sensor chips.

The present invention has been made to solve the problem in the conventional art described above, and its object is to provide an image reading apparatus and an image reading method capable of preventing a loss of data at a position corresponding to a position between adjacent sensor chips, thereby enhancing quality of a read image.

Means of Solving the Problem

An image reading apparatus according to the present invention includes: N sensor chips arranged in a first direction, N being an integer of two or more, each of the N sensor chips including a plurality of image pickup elements arranged in the first direction; N optical systems that respectively form, on the N sensor chips, reduced-size images of N reading ranges arranged in the first direction on a document; and an image processing section that uses image data of overlap regions that are regions where adjacent reading ranges of image data of the N reading ranges overlap each other, the image data of the overlap regions being image data generated by the N sensor chips, thereby obtaining positions in the first direction of the overlap regions of the adjacent reading ranges, obtains, from the positions in the first direction, magnifications of read images and synthesis positions that indicate positions where two pieces of the image data are combined, performs image processing of correcting the magnifications in the first direction of the image data of the N reading ranges, and combines the image data of the N reading ranges subjected to the image processing, thereby generating synthesized image data.

Effect of the Invention

According to the present invention, N optical systems can remove a loss of data at a position corresponding to a position between adjacent sensor chips of N sensor chips that are arranged in a main-scanning direction and can eliminate distortion (a positional difference between the synthesis positions) of N pieces of image data generated due to the N optical systems. As a result, high-quality synthesized image data corresponding to reading ranges on a document can be generated.

BRIEF DESCRIPTION OF THE DRAWINGS

FIG. 5A is a side view illustrating ranges of light travelling toward the sensor chips from a document at a position closer to the image pickup unit than the reference position, and FIG. 5B is a plan view illustrating ranges (ranges on the document) of light travelling toward the sensor chips and reading ranges to be read by the sensor chips in the case of FIG. 5A.

FIG. 6A is a diagram illustrating an example of ranges (ranges on the document) of light travelling toward the sensor chips from a document at a position closer to the image pickup unit than the reference position and a graphic pattern, FIG. 6B is a diagram illustrating images incident on the sensor chips in the case of FIG. 6A, and FIG. 6C is a diagram illustrating image data generated by the sensor chips in the case of FIG. 6B.

FIG. 7A is a side view illustrating ranges of light travelling toward the sensor chips of the image pickup unit from a document at a position farther from the image pickup unit than the reference position, and FIG. 7B is a plan view illustrating ranges (ranges on the document) of light travelling toward the sensor chips and reading ranges to be read by the sensor chips in the case of FIG. 7A.

FIG. 8A is a diagram illustrating an example of ranges (ranges on the document) of light travelling toward the sensor chips from a document at a position farther from the image pickup unit than the reference position and a graphic pattern on the document, FIG. 8B is a diagram illustrating images incident on the sensor chips in the case of FIG. 8A, and FIG. 8C is a diagram illustrating image data generated by the sensor chips in the case of FIG. 8B.

FIGS. 11A to 11C are diagrams for explaining an operation of a synthesizing unit in the case of FIGS. 4A to 4C where a document is at the reference position.

FIGS. 12A to 12C are diagrams for explaining an operation of the synthesizing unit in the case of FIGS. 6A to 6C where the document is at a position closer to the image pickup unit than the reference position.

FIGS. 13A to 13C are diagrams for explaining an operation of the synthesizing unit in the case of FIGS. 8A to 8C where the document is at a position farther from the image pickup unit than the reference position.

FIGS. 19A to 19C are diagrams for explaining an operation of the synthesizing unit in a case where a document is at a position closer to an image pickup unit than a reference position in the synthesizing unit according to the third embodiment.

FIGS. 20A to 20C are diagrams for explaining an operation of the synthesizing unit in a case where the document is at a position farther from the image pickup unit than the reference position in the synthesizing unit according to the third embodiment.

MODE FOR CARRYING OUT THE INVENTION

<1> First Embodiment

<1-1> Configuration of First Embodiment

Figure 1:
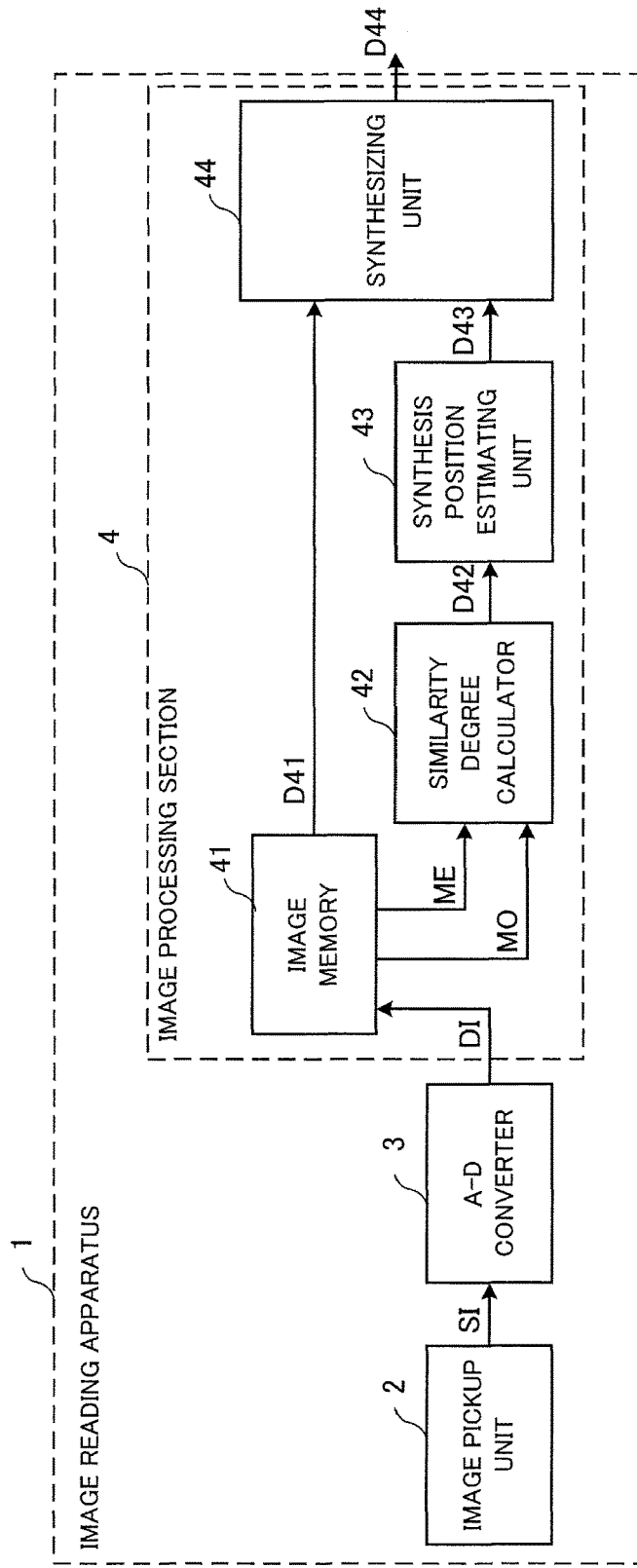
FIG. 1 is a functional block diagram illustrating a schematic configuration of an image reading apparatus according to a first embodiment of the present invention.

FIG. 1 is a functional block diagram illustrating a schematic configuration of an image reading apparatus 1 according a first embodiment of the present invention. As illustrated in FIG. 1, the image reading apparatus 1 includes an image pickup unit 2, an A-D (analog-to-digital) converter 3, and an image processing section 4. The image processing section 4 includes an image memory 41, a similarity degree calculator 42, a synthesis position estimating unit 43, and a synthesizing unit 44. The image reading apparatus 1 may include a conveyance section that conveys a document and a control section that controls the entire apparatus. The conveyance section and a processor serving as the control section will be described in a second embodiment mentioned later.

The image pickup unit 2 includes N (where N is an integer of two or more) sensor chips arranged linearly on a substrate. Each of the N sensor chips includes a plurality of image pickup elements that are linearly arranged. A direction (first direction) along which the plurality of image pickup elements are arranged will be referred to as a main-scanning direction. The N sensor chips are arranged in the main-scanning direction in such a manner that the image pickup elements of the N sensor chips are linearly arranged. The image pickup unit 2 includes N optical systems (cells) that form, on the N sensor chips, size-reduced images of a plurality of reading ranges on a document. Each of the N optical systems includes, for example, a lens and a diaphragm. The N optical systems prevent a loss of data at a position corresponding to a position between adjacent sensor chips of the N sensor chips that are linearly arranged. That is, the N sensor chips and the N optical systems are arranged in such a manner that two adjacent reading ranges (also referred to as reading regions) to be read by the adjacent sensor chips of the N sensor chips partially overlap each other in the ends of the adjacent reading ranges. These overlapping parts of the reading ranges (the regions that overlap each other) serve as overlapping regions (overlap regions).

An image signal SI generated by optically scanning the document with the image pickup unit 2 is converted to digital image data DI in the A-D converter 3. The image data DI is then input to the image processing section 4, and stored in the image memory 41 in the image processing section 4.

Figure 2:
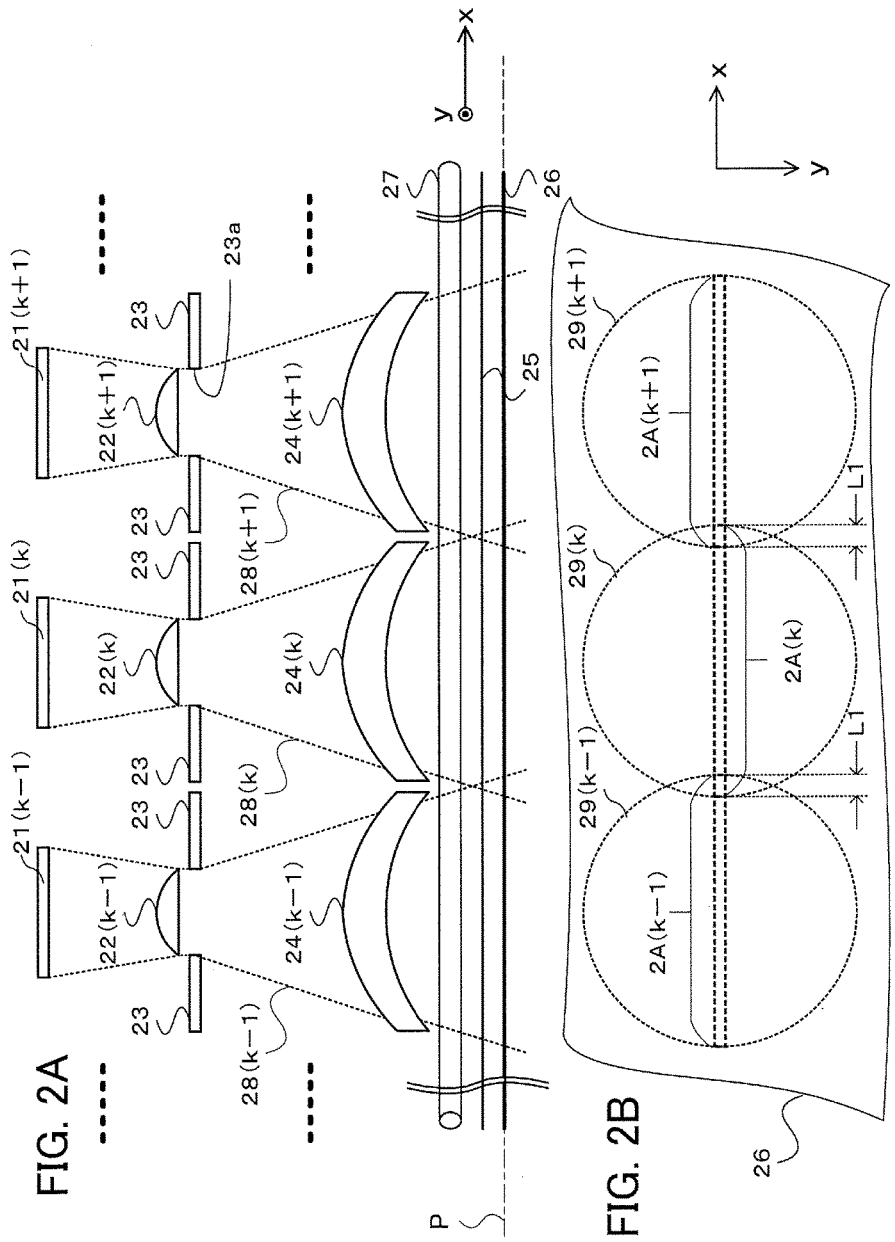
FIG. 2A is a side view illustrating ranges of light travelling from a document at a reference position toward sensor chips of an image pickup unit.
FIG. 2B is a plan view illustrating ranges (ranges on the document) of the light travelling toward the sensor chips and reading ranges to be read by the sensor chips in the case of FIG. 2A.

FIG. 2A is a side view illustrating ranges 28 of light travelling from a document 26 at a reference position P toward the sensor chips 21 of the image pickup unit 2 through the lenses 24, the diaphragms 23 having apertures 23a, and the lenses 22. FIG. 2B is a plan view illustrating ranges (ranges on the document 26) 29 of the light travelling toward the sensor chips 21 and reading ranges 2A to be read by the sensor chips 21 in the case of FIG. 2A. In the drawings, the main-scanning direction is represented by an x axis, and a sub-scanning direction orthogonal to the main-scanning direction is represented by a y axis.

Each of the N optical systems of the image pickup unit 2 includes the lens 22, the diaphragm 23 having the aperture 23a, and the lens 24. In the following description, k is an integer of not less than 1 and not more than N. The k-th sensor chip 21 in the N sensor chips will be also represented by 21(k). The k-th lens in the N lenses 22 will be also represented by 22(k). The k-th lens in the N lenses 24 will be also represented by 24(k). Similarly, the (k−1)th and (k+1)th sensor chips and lenses will be represented by the numbers indicating the order of arrangement in brackets.

The image reading apparatus 1 may include an illumination 27 that irradiates the document 26 with light. The illumination 27 can include, for example, an LED (light emitting diode) as a light source and a light guide member such as a resin member for converting light emitted from the LED to illumination light on the document 26. This light guide member is, for example, a cylindrical light guide member which has a length approximately equal to a width of the document 26. Light reflected on the document 26 is focused by the lenses 24. Unnecessary part of the light focused by the lenses 24 is blocked by the diaphragms 23, and necessary part of the light passes through the apertures 23a of the diaphragms 23. Light that has passed through the apertures 23a of the diaphragms 23 reaches the plurality of image pickup elements of the sensor chips 21 through the lenses 22.

A range 28(k−1) indicated by a broken line in FIG. 2A and a range 29(k−1) indicated by a broken line in FIG. 2B represent ranges of light that has reached the sensor chip 21(k−1). A range 28(k) indicated by a broken line in FIG. 2A and a range 29(k) indicated by a broken line in FIG. 2B represent a range of light that has reached the sensor chip 21(k). A range 28(k+1) indicated by a broken line in FIG. 2A and a range 29(k+1) indicated by a broken line in FIG. 2B represent a range of light that has reached the sensor chip 21(k+1).

The N sensor chips 21 and the N optical systems are arranged in such a manner that two adjacent reading ranges (e.g., a reading range 2A(k−1) and a reading range 2A(k), and a reading range 2A(k) and a reading range 2A(k+1) in FIG. 2B) on the document 26 to be read by adjacent sensor chips of the N sensor chips 21 partially overlap each other (e.g., regions having a width L1 in FIG. 2B). The overlapping reading ranges (which are regions overlapping each other) having the width L1 in the x axis direction serve as overlapping regions (overlap regions).

In FIG. 2A, the document 26 is conveyed in a direction perpendicular to the drawing sheet on which FIG. 2A is drawn and in a direction from the back to the front (+y axis direction) or from the front to the back (−y axis direction). The document 26 may be stationary with the image pickup unit 2 being conveyed from the direction from the back to the front (+y axis direction) or from the front to the back (−y axis direction). In other words, at least one of the document 26 and the image pickup unit 2 moves so that the document 26 and the image pickup unit 2 move relative to each other in the sub-scanning direction (second direction).

Figure 3:
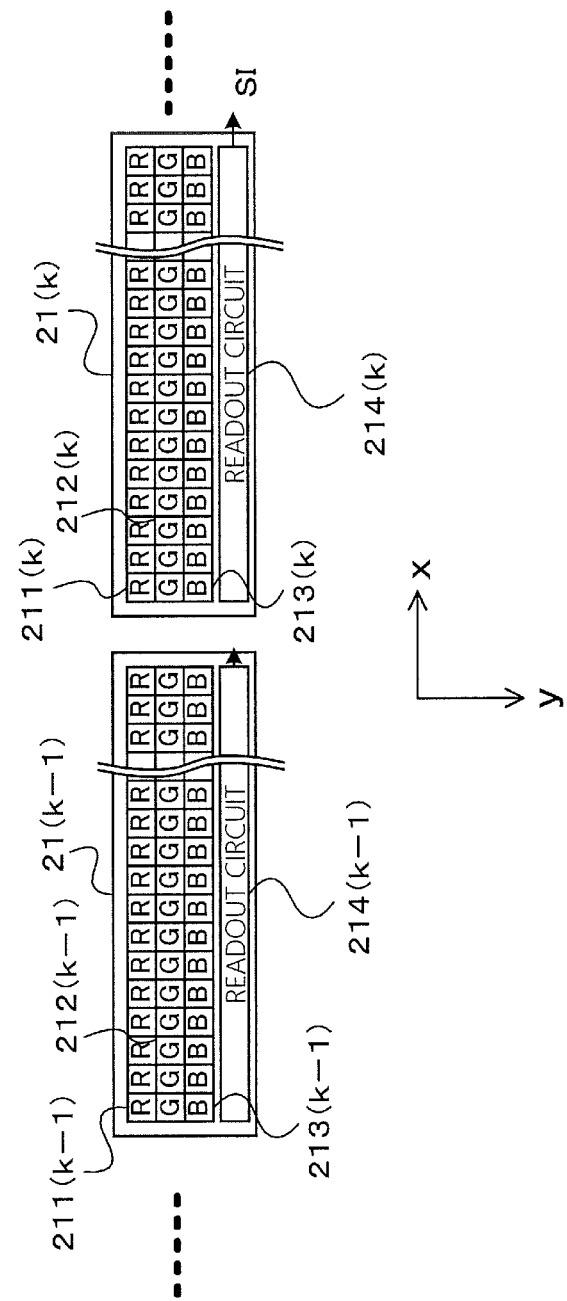
FIG. 3 is a plan view schematically illustrating a plurality of sensor chips of the image pickup unit illustrated in FIG. 1.

FIG. 3 is a plan view schematically illustrating the plurality of sensor chips 21 of the image pickup unit 2. FIG. 3 shows the sensor chips 21(k−1) and 21(k) of the N sensor chips 21. Each of the N sensor chips 21 includes a plurality of red image pickup elements (R image pickup elements) 211 each having a red (R) optical filter disposed on the image pickup element, a plurality of green image pickup elements (G image pickup elements) 212 each having a green (G) optical filter disposed on the image pickup element, a plurality of blue image pickup elements (B image pickup elements) 213 each having a blue (B) optical filter disposed on the image pickup element, and a readout circuit 214. For the k-th sensor chip 21(k), these components are also represented as an R image pickup element 211(k), a G image pickup element 212(k), a B image pickup element 213(k), and a readout circuit 214(k). Similarly, for the other sensor chips 21, the numbers indicating the order of arrangement are shown in brackets.

Light reflected on the document 26 is focused on the image pickup elements of the individual colors of the sensor chips 21. The R image pickup elements 211 perform photoelectric conversion on red light of the focused light, the G image pickup elements 212 perform photoelectric conversion on green light of the focused light, and the B image pickup elements 213 perform photoelectric conversion on blue light of the focused light. Electrical signals obtained by the photoelectric conversion are sequentially read out by the readout circuit 214 and output as signals SI.

The (k−1)th sensor chip 21(k−1) and the k-th sensor chip 21(k) are arranged in such a manner that the R image pickup elements of the (k−1)th sensor chip 21(k−1) and the R image pickup elements of the k-th sensor chip 21(k) are arranged on the same line, the G image pickup elements of the (k−1)th sensor chip 21(k−1) and the G image pickup elements of the k-th sensor chip 21(k) are arranged on the same line, and the B image pickup elements of the (k−1)th sensor chip 21(k−1) and the B image pickup elements of the k-th sensor chip 21(k) are arranged on the same line. Other adjacent sensor chips have similar positional relationships.

Although FIG. 3 shows an example in which the line of the plurality of R image pickup elements, the line of the plurality of G image pickup elements, and the line of the plurality of B image pickup elements are arranged vertically in this order on the sensor chips 21, the positions of these image pickup elements may be replaced. In the case of not obtaining color images, sensor chips each including a plurality of image pickup elements arranged in a single line and provided with no optical filters may be used.

FIGS. 2A and 2B illustrate a case where the document 26 at the reference position P is conveyed in a +y axis direction or a −y axis direction in the drawings. The reference position P is a predetermined position, and is, for example, a position at a predetermined distance from a glass surface 25. Here, the reference position P as the predetermined position is a position previously set by a user operation or the like, and is set by, for example, measuring a distance from the glass surface 25 as a reference, before the process is performed (not shown in the drawings).

The ranges 29 of light in FIG. 2B represent ranges, on the document 26, of light focused by the lenses 24. The range 29(k−1) of light is a range of light focused by the lens 24(k−1). The range 29(k) of light is a range of light focused by the lens 24(k). The range 29(k+1) of light is a range of light focused by the lens 24(k+1).

Since the plurality of image pickup elements are linearly arranged in the sensor chips 21 illustrated in FIG. 3, the reading ranges 2A of light among the ranges 29 of light focused by the lenses 24 are received by the sensor chips 21 and subjected to photoelectric conversion. The reading range 2A(k−1) is received by the sensor chip 21(k−1). The reading range 2A(k) is received by the sensor chip 21(k). The reading range 2A(k+1) is received by the sensor chip 21(k+1). The reading range 2A(k−1) and the reading range 2A(k) overlap each other in a part having the width L1 in the x axis direction. Similarly, the reading range 2A(k) and the reading range 2A(k+1) overlap each other in a part having the width L1 in the x axis direction. These parts of the reading ranges that overlap each other in parts each having the width L1 in the x axis direction are overlap regions.

Figure 4A:
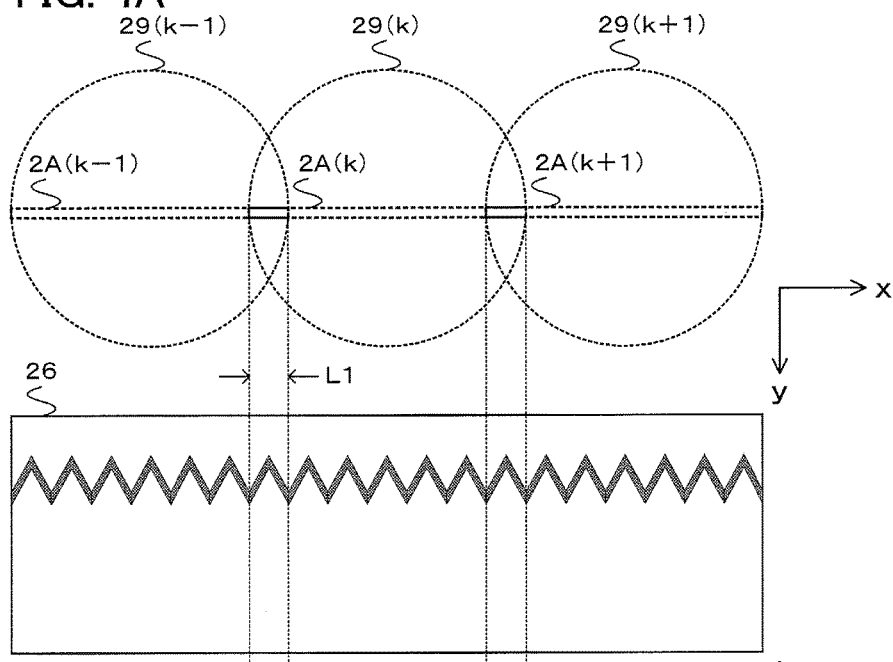
FIG. 4A is a diagram illustrating an example of ranges (ranges on the document) of light travelling from the document at the reference position toward the sensor chips and a graphic pattern on the document.
Figure 4B:
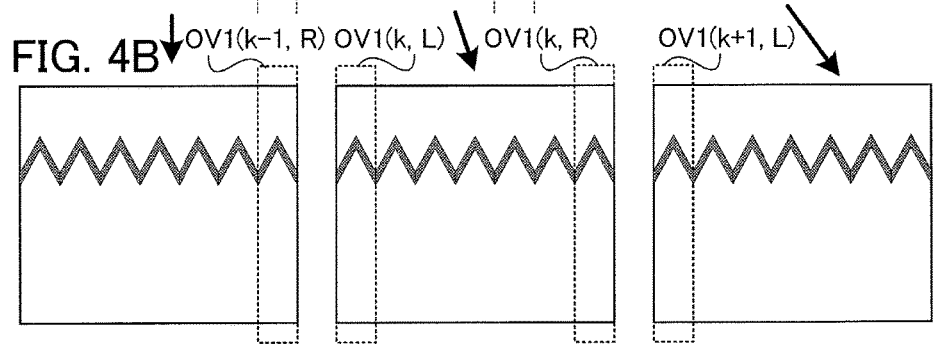
FIG. 4B is a diagram illustrating an example of images incident on the sensor chips in the case of FIG. 4A.
Figure 4C:
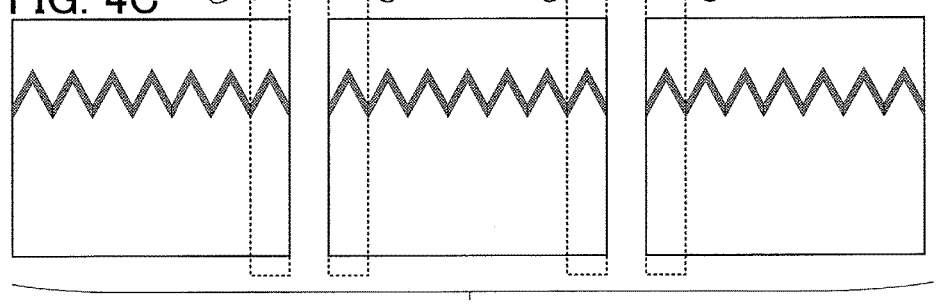
FIG. 4C is a diagram illustrating image data generated by the sensor chips in the case of FIG. 4B.

FIGS. 4A to 4C are diagrams for explaining images read by the sensor chips 21 in a case where the document 26 at the reference position (P in FIG. 2A) is conveyed in the y axis direction. FIG. 4A is a diagram illustrating an example of ranges (ranges on the document 26) 29 of light traveling from the document 26 at the reference position P toward the sensor chips 21 of the image pickup unit 2 through the lenses 24, the diaphragms 23, and the lenses 22 and an example of a graphic pattern (e.g., a zigzag pattern constituted by a plurality of repetitive "Λ"-shaped graphics) on the document 26. FIG. 4B is a diagram illustrating an example of images incident on the sensor chips 21 in the case of FIG. 4A. FIG. 4C is a diagram illustrating image data generated by the sensor chips 21 in the case of FIG. 4B.

With reference to FIGS. 4A to 4C, the case where the graphic pattern in which the plurality of "Λ"-shaped graphics are laterally arranged is printed on the document 26 will be described. To make it easier to understand the following description, in a case where the document 26 at the reference position P is conveyed in the y axis direction, the width (lateral width) of one "Λ"-shaped graphic coincides with the width L1 in the x axis direction of the overlap regions of the reading ranges 2A read by the adjacent sensor chips 21. That is, in FIG. 4A, the width in the x axis direction of one "Λ"-shaped graphic is equal to the width L1.

In FIGS. 4A to 4C, the document 26 is conveyed in the y axis direction with a reading surface thereof facing upward. The reference position P is defined relative to the glass surface 25, for example. In FIGS. 4A to 4C, the document 26 is conveyed at a position of the reference position P, and the ranges in the x axis direction of overlap regions OV2 illustrated in FIG. 4C are set in such a manner that the width in the x axis direction of each of the overlap regions OV2 coincides with the width in the x axis direction of one "Λ"-shaped graphic. In a manner similar to that of the reference position P, the width of each of the overlap regions OV2 at the reference position P is previously set by a user operation or the like (not shown in the drawings).

Next, a case where the document 26 is conveyed in the y axis direction at a position of (reference position−d) mm will be described. Here, d is a positive value. FIG. 5A is a side view illustrating ranges of light travelling toward the sensor chips 21 of the image pickup unit 2 from the document 26 closer to the image pickup unit 2 than the reference position P by d mm through the lenses 24, the diaphragms 23, and the lenses 22. FIG. 5B is a plan view illustrating ranges (ranges on the document 26) 29 of light travelling toward the sensor chips 21 and reading ranges 2A to be read by the sensor chips 21 in the case of FIG. 5A.

The ranges 28 of light focused by the lenses 24 become larger as they approach the glass surface 25 and the document 26 from the lens 24. The document 26 shown in FIGS. 5A and 5B is closer to the lenses 24 than that in FIGS. 2A and 2B, and thus the ranges 29 on the document 26 are smaller than the ranges in the case of FIGS. 2A and 2B. Thus, the widths in the x axis direction of the reading ranges 2A(k−1), 2A(k), and 2A(k+1) are smaller, and a width L2 in the x axis direction of the overlap regions of the reading range 2A(k−1) and the reading range 2A(k) is smaller than the width L1 in the x axis direction in the case of FIGS. 2A and 2B (L2<L1).

FIGS. 6A to 6C are diagrams for explaining images read by the sensor chips 21 in a case where the document 26 is conveyed in the y axis direction at a position of (reference position−d) mm. FIG. 6A is a diagram illustrating an example of ranges (ranges on the document 26) 29 of light traveling toward the sensor chips 21 of the image pickup unit 2 from the document 26 at a position closer to the image pickup unit 2 than the reference position P and the graphic pattern (zigzag pattern) on the document 26. FIG. 6B is a diagram illustrating images incident on the sensor chips 21 in the case of FIG. 6A. FIG. 6C is a diagram illustrating image data generated by the sensor chips 21 in the case of FIG. 6B.

With reference to FIGS. 6A to 6C, a case where the graphic pattern in which a plurality of "Λ"-shaped graphics are laterally arranged is printed on the document 26 will be described. To make it easier to understand the following description, in a case where the document 26 is conveyed at the position of (reference position−d) mm, the lateral width (width in the x axis direction) of one "Λ"-shaped graphic is larger than the width L2 in the x axis direction of the overlap regions of the reading ranges 2A read by the adjacent sensor chips 21.

In FIGS. 6A to 6C, the width L2 in the x axis direction of the overlap regions of the adjacent reading ranges 2A is smaller than the width L1 in the x axis direction of the overlap region illustrated in FIG. 4A, as described with reference to FIGS. 5A and 5B. Thus, as illustrated in FIG. 6B, the width in the x axis direction of one "Λ"-shaped graphic is not within the width in the x axis direction of each of the overlap regions OV1, and extends beyond the overlap region OV1 in the x axis direction. As illustrated in FIG. 6C, however, since the overlap regions OV2 set on the sensor chips 21 are independent of the positional relationship between the glass surface 25 and the document 26, the graphics outside the overlap regions OV1 in FIG. 6B are also contained within the overlap regions OV2 on the sensor chips 21. In the case of FIG. 6C, images obtained by the sensor chips 21 are enlarged as compared to images obtained in the case of FIG. 4C.

Next, a case where the document 26 is conveyed in the y axis direction at a position of (reference position+d) mm will be described. FIG. 7A is a side view illustrating ranges of light travelling toward the sensor chips 21 from the document 26 at a position farther from the image pickup unit 2 than the reference position P through the lenses 24, the diaphragms 23, and the lenses 22. FIG. 7B is a plan view illustrating ranges (ranges on the document 26) 29 of light travelling toward the sensor chips 21 in the case of FIG. 7A and reading ranges 2A to be read by the sensor chips 21.

In FIGS. 7A and 7B, since the document 26 is located away farther from the lenses 24 than in the case of FIGS. 2A and 2B, the ranges 29 of light on the document 26 are larger than the ranges in the case illustrated in FIGS. 2A and 2B. Thus, the widths in the x axis direction of the reading ranges 2A(k−1), 2A(k), and 2A(k+1) are large, and a width L3 in the x axis direction of the overlapping regions (overlap regions) of the reading range 2A(k−1) and the reading range 2A(k) is larger than the width L1 in the x axis direction in the case of FIGS. 2A and 2B (L3>L1).

FIGS. 8A and 8C are diagrams for explaining images read by the sensor chips 21 in a case where the document 26 is conveyed in the y axis direction at a position of (reference position+d) mm. FIG. 8A is a diagram illustrating an example of ranges (ranges on the document 26) 29 of light traveling toward the sensor chips 21 from the document 26 at a position farther from the image pickup unit 2 than the reference position P and the graphic pattern (zigzag pattern) on the document 26. FIG. 8B is a diagram illustrating images incident on the sensor chips 21 in the case of FIG. 8A. FIG.

8C is a diagram illustrating image data generated by the sensor chips 21 in the case of FIG. 8B.

In FIGS. 8A to 8C, since the width in the x axis direction of the overlap regions of adjacent reading ranges 2A is L3 that is larger than L1 as described with reference to FIGS. 5A and 5B, one "A"-shaped graphic falls within a corresponding one of the overlap regions OV1 as illustrated in FIG. 8B. However, as illustrated in FIG. 8C, since the overlap regions OV2 set on the sensor chips 21 are independent of the positional relationship between the glass surface 25 and the document 26, the entire overlap regions OV1 illustrated in FIG. 8B are not contained within the overlap regions OV2 on the sensor chips 21. In the case of FIG. 8C, images obtained by the sensor chips 21 are reduced in size as compared to those in the case illustrated in FIG. 4C.

Next, in the image reading apparatus 1, with respect to the digital image data DI supplied from the A-D converter 3, the image processing section 4 corrects the magnifications of image data of the reading ranges corresponding to the sensor chips, performs image processing for synthesizing the image data of the reading ranges corresponding to the N sensor chips, and thereby generates synthesized image data D44.

The image processing section 4 compares the image data of the adjacent overlap regions by using the image data of overlap regions in the image data of the reading ranges (reading regions) corresponding to the N sensor chips in the image data DI stored in the image memory 41, determines positions of the overlap regions having the highest correlation (also referred to as the highest degree of similarity), which are parts of the reading regions read from the document at the same position, obtains magnifications of read images and synthesis positions that indicate positions where two pieces of image data are combined, based on the positions of the overlap regions, corrects the magnifications of the image data of the reading ranges corresponding to the sensor chips, performs image processing of synthesizing the image data of the reading ranges corresponding to the N sensor chips, and thereby generates the synthesized image data D44. A configuration of the image processing section 4 will now be described with reference to FIG. 1.

The similarity degree calculator 42 calculates the degree of correlation (i.e., the degree of similarity, which will be hereinafter referred to as a similarity degree) by comparing image data of matching regions set in the overlap regions and performing matching processing (obtaining a positional difference between the matching regions) among pixels, by using the image data of the overlap regions which are regions where the adjacent reading ranges overlap each other, out of the image data which are image data generated by the N sensor chips and image data of the N reading ranges on the document. The degree of correlation is calculated and output as similarity degree data (signal D42) that is an index indicating the degree of similarity among the image data of the overlap regions.

From the similarity degree data D42 calculated by the similarity degree calculator 42, the synthesis position estimating unit 43 estimates the synthesis positions (signal D43) that indicate positions of overlap regions having the highest correlation (having the highest degree of similarity) and positions at which two pieces of image data of adjacent reading ranges are combined, and outputs the position data D43 indicating the synthesis positions, based on the estimated positions.

By using the magnifications for the image data of the N reading ranges based on the synthesis positions estimated by the synthesis position estimating unit 43, the synthesizing unit 44 sets (i.e., equal magnifies or enlarges or reduces by using the magnifications) the widths in a main-scanning direction of the image data of the N reading ranges, synthesizes the image data, and thereby generates the synthesized image data D44. Through repetition of the foregoing processing, image data corresponding to an image on the document as a reading object is generated. The image processing section 4 can make distortion of the image data generated due to the N optical systems and a resultant positional difference between of the synthesis positions inconspicuous.

Figure 16:
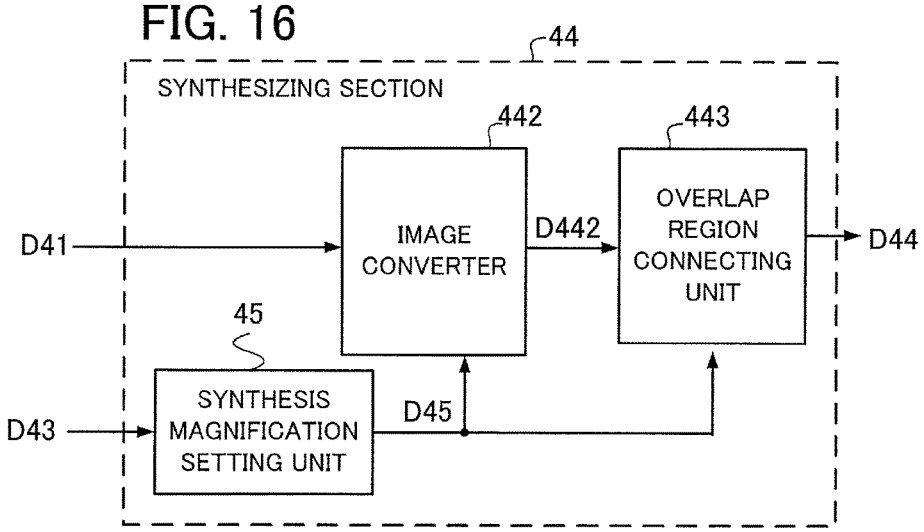
FIG. 16 is a block diagram illustrating a configuration example of a synthesizing unit in the image reading apparatus according to the first embodiment.

The synthesizing unit 44 is configured as illustrated in, for example, FIG. 16. The synthesizing unit 44 illustrated in FIG. 16 sets synthesis magnifications and synthesis positions of the image data of the reading ranges by using a positional difference between the position data D43 supplied from the synthesis position estimating unit 43 and synthesis reference positions Pr on the overlap regions, converts the magnifications of the image by using the synthesis magnifications, and combines (also referred to as "connects" or "bonds") the images of the overlap regions in accordance with the synthesis positions, thereby generating and outputting the synthesized image data D44. The synthesis reference positions Pr on the overlap regions are set according to the positions of the overlap regions OV2 at the reference position P, and are predetermined reference positions previously set by a user operation or the like (not shown in the drawings).

As illustrated in FIG. 16, the synthesizing unit 44 includes a synthesis magnification setting unit 45, an image converter 442, and an overlap region connecting unit 443.

The position data D43 input to the synthesizing unit 44 from the synthesis position estimating unit 43 is input to the synthesis magnification setting unit 45. From positional differences between the position data D43 and the synthesis reference positions Pr in the overlap regions in the main-scanning direction (x axis direction), the synthesis magnifications and the synthesis positions of the image data of the reading ranges are set, and synthesis magnification position data D45 indicating the synthesis magnifications and the synthesis positions is output. The synthesis magnification setting unit 45 is configured as illustrated in, for example, FIG. 17, and includes a reading width calculator 451 and a magnification and synthesis position setting unit 452.

The reading width calculator 451 in the synthesis magnification setting unit 45 calculates reading widths Wc in the main-scanning direction (widths in the main-scanning direction of the reading regions) with respect to the image data of the reading ranges (reading regions) read by the cells, from the position data D43 supplied from the synthesis position estimating unit 43. The reading widths Wc can be obtained by calculating a difference between two pieces of position data D43 obtained in overlap regions at both ends of each reading region. The magnification and synthesis position setting unit 452 sets the synthesis magnifications from a difference between the reading width Wc supplied from the reading width calculator 451 and a width Wr between synthesis reference positions Pr at both ends of the reading region read by each of the cells (i.e., positional differences between the synthesis positions of the reading regions and the reference position), obtains the position data D43 from the synthesis position estimating unit 43 as positions of synthesis (synthesis positions) converted (moved) by using the set synthesis magnifications, and outputs the obtained data as the synthesis magnification position data D45 indicating the synthesis magnifications and the synthesis positions. The width Wr between the synthesis reference positions Pr at both ends of the reading region can be previously set based on the synthesis reference positions Pr, and is a reference width previously set by a user operation or the like (not shown in the drawings).

The image converter 442 of the synthesizing unit 44 converts the magnifications of the image of the reading regions read by the cells in the image data DI stored in the image memory 41, by using the synthesis magnifications based on the synthesis magnification position data D45 supplied from the synthesis magnification setting unit 45, to thereby correct the magnifications of image data of the reading regions corresponding to the sensor chips and output magnification-converted image data D442. In accordance with the synthesis positions based on the synthesis magnification position data D45, the overlap region connecting unit 443 combines images of overlap regions in the magnification-converted image data D442 whose magnifications have been corrected by the image converter 442 to, thereby, generate and output the synthesized image data D44. Performing the combination by the overlap region connecting unit 443 by performing, for example, weighting addition of image data at the synthesis positions and its surrounding image data makes it possible to obtain a synthesis image in which distortion of image data and a resultant positional difference between the synthesis positions are made inconspicuous.

<1-2> Operation in First Embodiment

<Operation of Image Pickup Unit 2>

The image pickup unit 2 outputs a signal SI obtained by photoelectric conversion of light reflected on the document 26 to the A-D converter 3. The A-D converter 3 converts the signal SI from an analog signal to a digital signal and outputs image data DI based on the digital signal to the image processing section 4.

The image data DI output from the A-D converter 3 is input to the image memory 41 of the image processing section 4. The image memory 41 temporarily stores the image data DI and outputs image data MO and image data ME in the overlap regions to the similarity degree calculator 42. The image data MO is image data of overlap regions corresponding to sensor chips in odd-numbered cells. The image data ME is image data of overlap regions corresponding to sensor chips in even-numbered cells.

<Operation of Similarity Degree Calculator 42>

Figure 9:
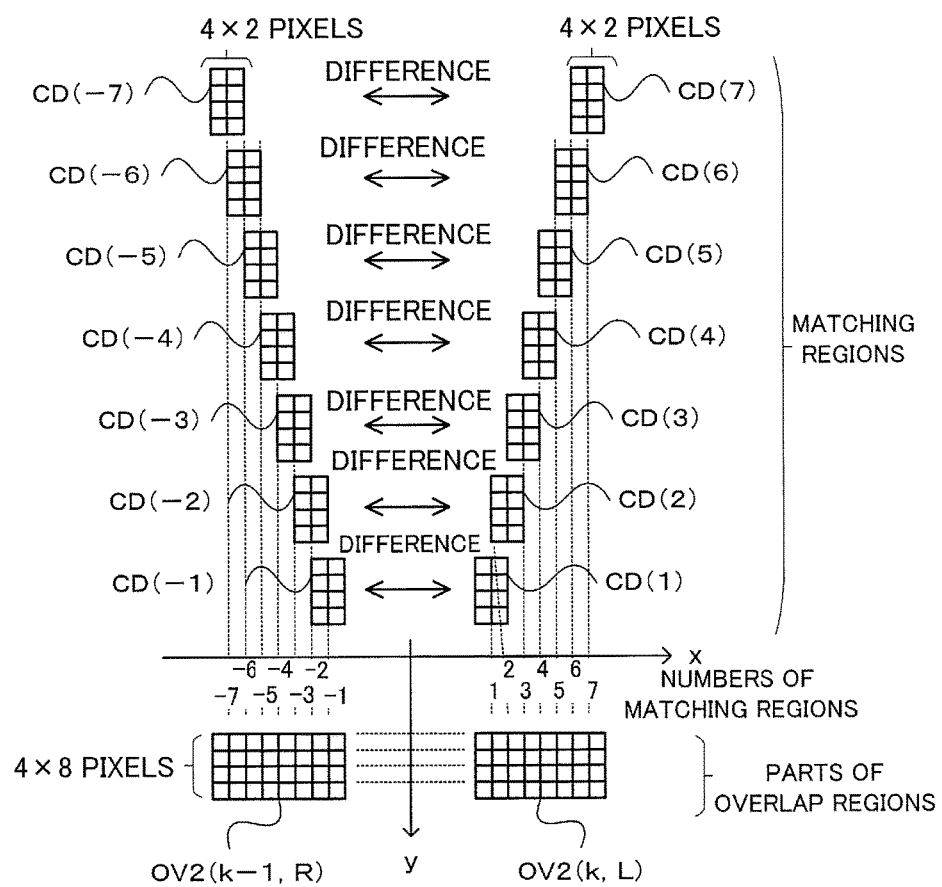
FIG. 9 is a diagram for explaining an operation of a similarity degree calculator illustrated in FIG. 1.

FIG. 9 is a diagram for explaining an operation of the similarity degree calculator 42 of the image processing section 4 illustrated in FIG. 1. In FIG. 9, OV2($k$–1, R) represents an overlap region (8×4 pixels) at the right in the x axis direction of image data generated by the (k–1)th sensor chip 21($k$–1). OV2($k$, L) represents an overlap region (8×4 pixels) at the left of image data generated by the k-th sensor chip 21($k$) adjacent to the (k–1)th sensor chip 21($k$–1). Each of CD(–1) to CD(–7) represents a matching region of 4×2 pixels extracted from the overlap region OV2($k$–1, R). Here, identification numbers from –1 to –7 in brackets indicate the numbers of the matching regions. Each of CD(1) to CD(7) represents a matching region of 4×2 pixels extracted from the overlap region OV2($k$, L). Here, identification numbers from 1 to 7 in brackets indicate the numbers of the matching regions.

As illustrated in FIG. 9, in the first embodiment, the matching regions CD(–7) to CD(–1) are extracted from the overlap region OV2($k$–1, R), and the matching regions CD(1) to CD(7) are extracted from the overlap region OV2($k$, L) of the adjacent cell. In the adjacent overlap regions, the matching regions CD(–7) to CD(–1) are extracted from one overlap region OV2($k$, R), and the matching regions CD(1) to CD(7) are extracted from the other overlap region OV2($k$+1, L).

The similarity degree calculator 42 calculates the degree of correlation (degree of similarity) by performing matching processing between pixels in regions at the same position (obtaining positional differences between the regions) in the matching regions CD(–1) to CD(–7) and the matching regions CD(1) to CD(7). For example, an absolute value of the difference between pixels at the same position in the matching region CD(–1) and the matching region CD(1) is calculated, the sum of differential absolute values of the entire matching regions CD(–1) and CD(1) is calculated, and the obtained sum is output as data D42(1) indicating the degree of similarity (hereinafter also referred to as "the sum of differential absolute values" or "similarity degree data"). Similarly, with respect to the matching region CD(–2) and the matching region CD(2), the sum of differential absolute values is calculated and output as data D42(2). With respect to the matching region CD(–3) and the matching region CD(3) to the matching region CD(–7) and the matching region CD(7), similar calculation is performed, and the sums D42(3) to D42(7) of differential absolute values are output.

In the description with reference to FIG. 9, the overlap regions have a width constituted by eight pixels (in the x axis direction) and a height constituted by four pixels (in the y axis direction), and the matching regions as parts of the overlap regions have a width constituted by two pixels (in the x axis direction) and a height of four pixels (in the y axis direction). However, the present invention is not limited to this example. The degree of similarity may be obtained by using, as the matching regions, the entire overlap region having a predetermined height (width in the y axis direction) and moving the center position sequentially with reference to the center position of the width of the overlap region (the x axis direction), or by fixing a matching region in one overlap region OV2($k$–1, R) of the adjacent overlap regions and moving another matching region in the other overlap region OV2($k$, L).

As the value of each of the similarity degree data D42(1) to D42(7) as the sum of differential absolute values calculated by the similarity degree calculator 42 decreases, the difference between pixels in two matching regions used for the differential calculation decreases, and the degree of correlation (the degree of similarity) increases, that is, the degree of similarity as an index indicating the degree of similarity between the two matching regions increases (more similar to each other). Thus, quality of an image at a joint can be enhanced in such a manner that adjacent two pieces of image data are synthesized by using, as overlap regions that are synthesis positions (joint positions) and are actually read, positions having the smallest sum of differential absolute values (i.e., positions having the highest degree of similarity, that is, positions having the highest correlation) among the sums D42(1) to D42(7) of differential absolute values, and then by setting the magnifications of the image based on the positions. The similarity degree calculator 42 outputs the similarity degree data D42 including the sums D42(1) to D42(7) of differential absolute values to the synthesis position estimating unit 43.

<Operation of Synthesis Position Estimating Unit 43>

Figure 10A:
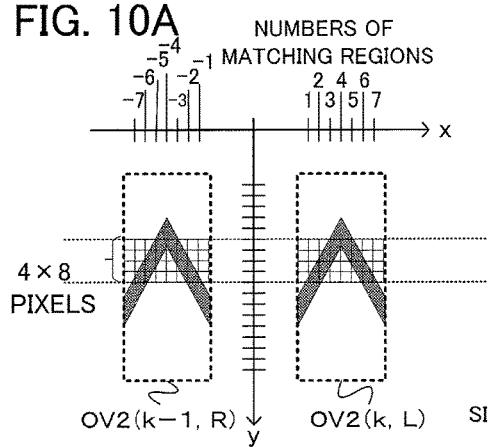
FIGS. 10A to 10F are diagrams for explaining an operation of a synthesis position estimating unit illustrated in FIG. 1.
Figure 10B:
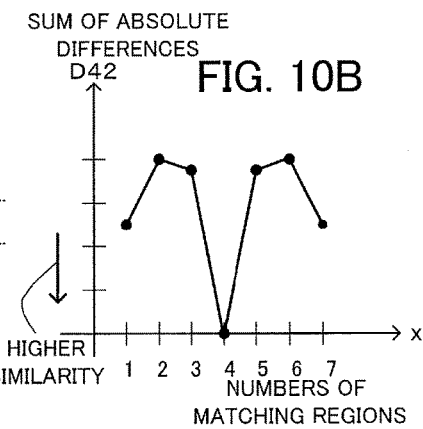
Figure 10C:
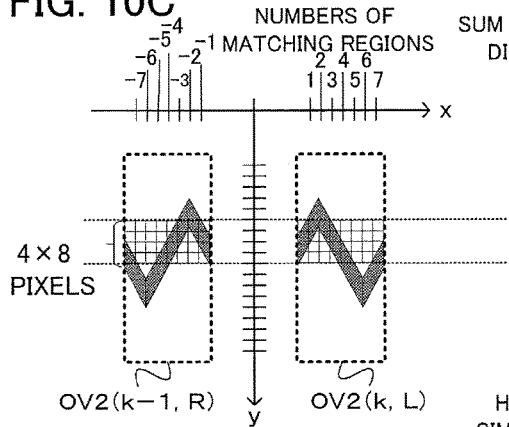
Figure 10D:
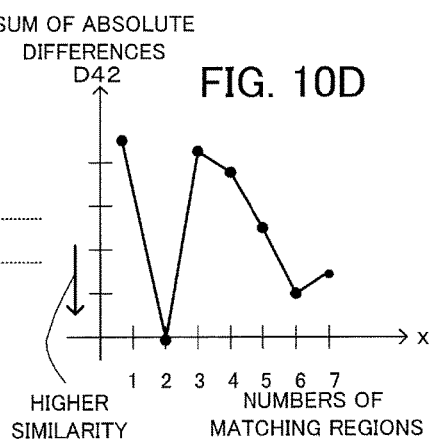
Figure 10E:
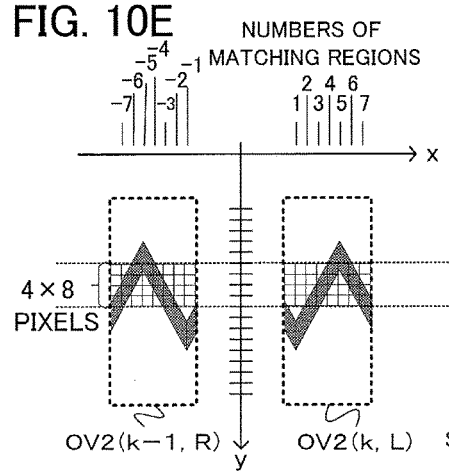
Figure 10F:
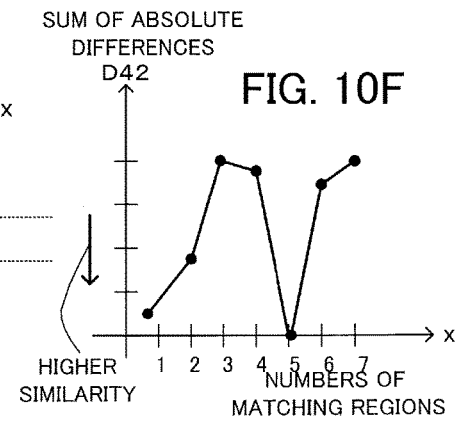

FIGS. 10A to 10F are diagrams for explaining an operation of the synthesis position estimating unit 43. FIGS. 10A and 10B are diagrams for explaining an operation in a case where the document 26 is at the reference position P (the case of FIGS. 4A to 4C). FIGS. 10C and 10D are diagrams for explaining an operation in a case where the document 26 is at the position closer to the sensor chips 21 than the reference position P (the case of FIGS. 6A to 6C). FIGS. 10E and 10F are diagrams for explaining an operation in a case where the document 26 is at the position farther from the sensor chips 21 than the reference position P (the case of FIGS. 8A to 8C). FIGS. 10A, 10C, and 10E illustrate positional relationships between the matching regions CD(−7) to CD(−1) in the right overlap region OV2(k−1, L) of image data generated by the (k−1)th sensor chip 21(k−1) and the matching regions CD(1) to CD(7) in the left overlap region OV2(k, L) of image data generated by the k-th sensor chip 21(k). FIGS. 10B, 10D, and 10F are diagrams showing similarity degree data (the sum of differential absolute values) D42 corresponding to image data of the matching regions illustrated in FIGS. 10A, 10C, and 10E.

In FIG. 10B, the sum of differential absolute values when x=4, that is, between CD(−4) and CD(4) is the smallest (i.e., the degree of similarity is the highest). In this case, the synthesis position estimating unit 43 outputs the position data D43 by using x=4 as synthesis positions.

In FIG. 10D, the sum of differential absolute values when x=2, that is, between CD(−2) and CD(2) is the smallest (i.e., the degree of similarity is the highest). In this case, the synthesis position estimating unit 43 outputs the position data D43 by using x=2 as synthesis positions.

In FIG. 10F, the sum of differential absolute values when x=5, that is, between CD(−5) and CD(5) is the smallest (i.e., the degree of similarity is the highest). In this case, the synthesis position estimating unit 43 outputs the position data D43 by using x=5 as synthesis positions.

At every line, that is, every time when the document 26 is conveyed by a distance corresponding to one pixel in the y axis direction, the similarity degree calculator 42 sets the matching regions CD with respect to the overlap regions which are at both ends of the reading ranges of the sensor chips and have a symmetrical arrangement about a target line, and outputs similarity degree data (sum of differential absolute values) D42. Similarly, the synthesis position estimating unit 43 outputs the position data D43 as the synthesis positions, based on the similarity degree data D42 that is the sum of differential absolute values calculated by the similarity degree calculator 42 for each line. In the description with reference to FIGS. 10A to 10F, the position of y=8 is the target line.

In the description with reference to FIGS. 10A to 10F, the position data D43 as a synthesis position is represented by an integer. However, the synthesis positions may be obtained by obtaining an approximate curve connecting points of the sums of differential absolute values on an orthogonal coordinate system having an x axis and a D42 axis, and obtaining an x coordinate at a point where the value of D42 is the minimum value on the approximate curve with accuracy of decimal fractions (also referred to as an accuracy in units of sub-pixels).

In the foregoing description, the similarity degree data D42 is calculated from the sum of differential absolute values in the matching regions set in the overlap regions for each pixel. However, instead of the sum of differential absolute values, the sum of squares of the differences may be used to calculate the similarity degree data D42.

<Operation of Synthesizing Unit 44>

An operation of the synthesizing unit 44 will now be described.

FIGS. 11A to 11C are diagrams for explaining an operation of the synthesizing unit 44 in a case where the document 26 is at the reference position P (the case of FIGS. 2A and 2B and FIGS. 4A to 4C). FIG. 11A illustrates image data D41 read out from the image memory 41. FIG. 11B illustrates image data obtained by performing magnification conversion (equal magnification in FIGS. 11A to 11C) on the image data D41 in the x axis direction (the direction of arrangement of the image pickup elements, the direction of arrangement of the plurality of sensor chips) by using the synthesis magnifications indicated by the synthesis magnification position data D45 supplied from the synthesis magnification setting unit 45 in the synthesizing unit 44. FIG. 11C illustrates the synthesized image data D44 obtained by synthesizing the image data illustrated in FIG. 11B (combining the image data at synthesis positions indicated by the synthesis magnification position data D45 based on the synthesis positions Pc).

FIGS. 4A to 4C illustrate the case where the document 26 is at the reference position P. Thus, the synthesis positions Pc indicated by the position data D43 calculated by the synthesis position estimating unit 43 coincide with the synthesis reference positions Pr on the overlap regions. Here, the synthesis reference positions Pr are predetermined positions that are independent of the position of the document 26. As illustrated in FIG. 11A, since the calculated synthesis positions Pc coincide with the synthesis reference positions Pr, the width Wc in the x axis direction between two calculated synthesis positions Pc coincides with the width Wr in the x axis direction between two synthesis reference positions Pr (Wc=Wr). Thus, the reading width calculator 451 of the synthesis magnification setting unit 45 in the synthesizing unit 44 calculates the width Wc in the x axis direction between the synthesis positions Pc, and the magnification and synthesis position setting unit 452 sets the synthesis magnifications at, for example, Wr/Wc=1 from the reading width Wc supplied from the reading width calculator 451 and the reference width Wr in the x axis direction between the synthesis reference positions Pr, and the synthesis positions Pc remain at the same synthesis positions. The image converter 442 performs magnification conversion on the image data DI at the synthesis magnifications of 1 (equal magnification) to correct the magnifications of the image data, combines images of the overlap regions, and thereby generates and outputs the synthesized image data D44. Thus, in the case of FIGS. 11A to 11C, the synthesizing unit 44 performs neither enlargement nor reduction on the image data illustrated in FIG. 11A, and using the image data of the same size illustrated in FIG. 11B, and synthesizes the image data as illustrated in FIG. 11C. In this synthesis, the synthesizing unit 44 outputs the synthesized image data D44 obtained by performing weighting addition on images of the adjacent overlap regions.

FIGS. 12A to 12C are diagrams for explaining an operation of the synthesizing unit 44 in a case where the document 26 is at a position of (reference position−d) mm (the case of FIGS. 5A and 5B and FIGS. 6A to 6C). FIG. 12A illustrates image data D41 read out from the image memory 41. FIG. 12B illustrates image data obtained by performing magnification conversion (reduction in FIGS. 12R to 12C) on the image data D41 in the x axis direction (the direction of arrangement of the image pickup elements, the direction of arrangement of the plurality of sensor chips 21) by using the synthesis magnifications in the synthesis magnification position data D45 supplied from the synthesis magnification setting unit 45 in the synthesizing unit 44. FIG. 12C illustrates the synthesized image data D44 obtained by synthesizing the image data illustrated in FIG. 12B (combining the image data at the synthesis positions by the synthesis magnification position data D45 based on the synthesis positions Pc).

FIGS. 6A to 6C illustrate the case where the document 26 is at a position of (reference position −d) mm. Thus, the synthesis positions Pc in the drawing indicated by the position data D43 calculated by the synthesis position estimating unit 43 do not coincide with the synthesis reference positions Pr in the overlap regions, and the synthesis positions Pc are outside the synthesis reference positions Pr. As illustrated in FIG. 12A, since the synthesis positions Pc indicated by the calculated position data D43 are outside the synthesis reference positions Pr, the width Wc in the x axis direction between two calculated synthesis positions Pc is larger than the width Wr in the x axis direction between two synthesis reference positions Pr (Wc >Wr). Accordingly, the reading width calculator 451 of the synthesis magnification setting unit 45 in the synthesizing unit 44 calculates the width Wc in the x axis direction between the synthesis positions Pc, and the magnification and synthesis position setting unit 452 sets the synthesis magnifications as, for example, a Wr/Wc magnification (a value indicating a reduction magnification less than 1) from the reading width Wc supplied from the reading width calculator 451 and the reference width Wr in the x axis direction between the synthesis reference positions Pr, and converts the synthesis positions Pc to positions obtained by the Wr/Wc magnification conversion. The image converter 442 performs magnification conversion on the image data DI at the synthesis magnifications of Wr/Wc to correct the magnifications of the image data, combines images of the overlap regions, and generates and outputs the synthesized image data D44. Thus, in the case of FIGS. 12A to 12C, the synthesizing unit 44 reduces the image data illustrated in FIG. 12A, and makes the synthesis positions Pc coincide with the synthesis reference positions Pr as illustrated in FIG. 12B. As a reduction magnification, a Wr/Wc magnification can be used, for example. Thereafter, as illustrated in FIG. 12C, the synthesizing unit 44 synthesizes image data by using image data illustrated in FIG. 12B. In this synthesis, the synthesizing unit 44 performs weighting addition on images of the adjacent overlap regions to thereby output bonded synthesized image data D44.

FIGS. 13A to 13C are diagrams for explaining an operation of the synthesizing unit 44 in a case where the document 26 is at a position of (reference position+d) mm (the case of FIGS. 7A and 7B and FIGS. 8A to 8C). FIG. 13A illustrates image data D41 read out from the image memory 41. FIG. 13B illustrates image data obtained by performing magnification conversion (enlargement in FIGS. 13A to 13C) on the image data D41 in the x axis direction (the direction of arrangement of the image pickup elements, the direction of arrangement of the plurality of sensor chips) by using the synthesis magnifications in the synthesis magnification position data D45 supplied from the synthesis magnification setting unit 45 in the synthesizing unit 44. FIG. 13C illustrates the synthesized image data D44 obtained by synthesizing the image data illustrated in FIG. 13B (combining the image data at synthesis positions by the synthesis magnification position data D45 based on the synthesis positions Pc).

FIGS. 8A and 8C illustrate the case where the document 26 is at a position of (reference position+d) mm. Thus, the synthesis positions Pc indicated in the drawings by the position data D43 calculated by the synthesis position estimating unit 43 do not coincide with the synthesis reference positions Pr on the overlap regions, and the synthesis positions Pc are inside the synthesis reference positions Pr. As illustrated in FIG. 13A, since the synthesis positions Pc indicated by the calculated position data D43 are inside the synthesis reference positions Pr, the width Wc in the x axis direction between two calculated synthesis positions Pc is smaller than the width Wr in the x axis direction between two synthesis reference positions Pr (Wc<Wr). Accordingly, the reading width calculator 451 of the synthesis magnification setting unit 45 in the synthesizing unit 44 calculates the width Wc in the x axis direction between the synthesis positions Pc, and the magnification and synthesis position setting unit 452 sets the synthesis magnifications as, for example, a Wr/Wc magnification (a value indicating an enlargement magnification greater than 1) from the reading width Wc supplied from the reading width calculator 451 and the reference width Wr in the x axis direction between the synthesis reference positions Pr, and converts the synthesis positions Pc to positions obtained by the Wr/Wc magnification conversion. The image converter 442 performs magnification conversion on the image data DI at the synthesis magnifications of Wr/Wc to correct the magnifications of the image data, combines images of the overlap regions, and generates and outputs the synthesized image data D44. Thus, in the case of FIGS. 13A to 13C, the synthesizing unit 44 enlarges the image data illustrated in FIG. 13A, and makes the synthesis positions Pc coincide with the synthesis reference positions Pr as illustrated in FIG. 13B. As an enlargement magnification, a Wr/Wc magnification can be used, for example. Thereafter, as illustrated in FIG. 13C, the synthesizing unit 44 synthesizes image data by using image data illustrated in FIG. 13B. In this synthesis, the synthesizing unit 44 outputs the synthesized image data D44 combined by performing weighting addition on images of the adjacent overlap regions.

<1-3> Effect of First Embodiment

As described above, the image reading apparatus 1 according to the first embodiment has a configuration in which the plurality of sensor chips 21 are linearly arranged while the adjacent reading ranges on the document 26, such as adjacent reading ranges 2A(k−1) and 2A(k) and adjacent reading ranges 2A(k) and 2A(k+1), overlap each other, by using optical systems such as the lenses 24 and the plurality of sensor chips 21 are linearly arranged, and can obtain image data without a loss of data between adjacent sensor chips 21.

In addition, the image processing section 4 estimates the synthesis positions Pc serving as the position of the overlap regions, and based on the synthesis positions Pc as the positions of the overlap regions, obtains magnifications of read images to perform magnification conversion (equal magnification, enlargement, or reduction) on the image data in the x axis direction, and synthesizes the image data obtained by the magnification conversion. Thus, even when the distance from the reference position P to the document 26 changes, a joint between adjacent images (a synthesis position) can be made inconspicuous.

<2> Second Embodiment

Part of the functions of the image reading apparatuses 1 according to the first embodiment and a third embodiment described later may be implemented by a hardware configuration, or a computer program executed by a microprocessor including a CPU (central processing unit). In a case where part of the functions of the image reading apparatus 1 is implemented by a computer program, the microprocessor can load a computer program from a computer-readable storage medium and execute the computer program, thereby implementing the part of the functions of the image reading apparatus 1.

Figure 14:
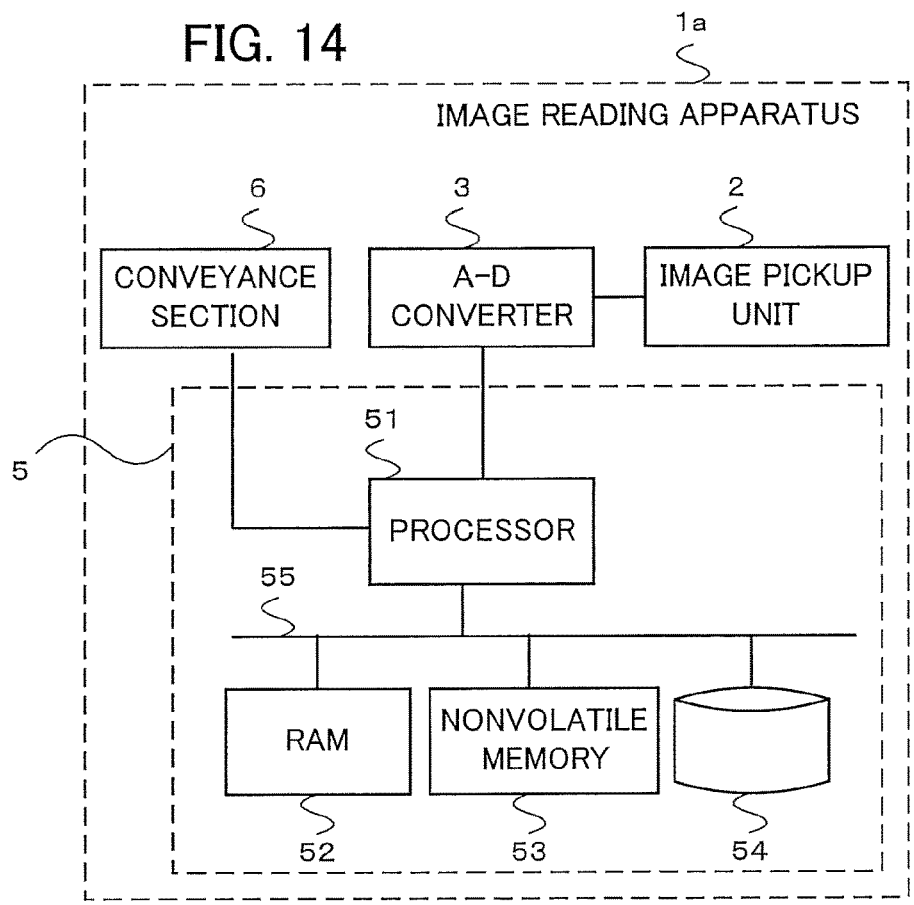
FIG. 14 is a hardware configuration diagram illustrating an example of a configuration of an image reading apparatus according to a second embodiment of the present invention.

FIG. 14 is a block diagram illustrating a hardware configuration in which part of the functions of the image reading apparatus can be implemented by a computer program. As illustrated in FIG. 14, an image reading apparatus 1a includes an image pickup unit 2, an A-D converter 3, a computation device 5, a conveyance section 6 that conveys a document in a y axis direction (illustrated in FIGS. 2A and 2B). The computation device 5 includes a processor 51 including a CPU, a RAM (random access memory) 52, a nonvolatile memory 53, a mass-storage unit 54, and a bus 55. As the nonvolatile memory 53, a flash memory can be used, for example. As the mass-storage unit 54, a hard disk (magnetic disk) device, an optical disk storage device, and a semiconductor storage device can be used, for example. The conveyance section 6 can be configured as a mechanism that moves the image pickup unit 2.

The A-D converter 3 has the same function as the A-D converter 3 of FIG. 1, converts an electrical signal SI output from the image pickup unit 2 to digital image data DI, and stores the image data DI in the RAM 52 (functioning as the image memory 41) through the processor 51.

The processor 51 can load a computer program from the nonvolatile memory 53 or the mass-storage unit 54 and execute the loaded computer program, thereby implementing the function of the image processing section 4 in the first embodiment.

Figure 15:
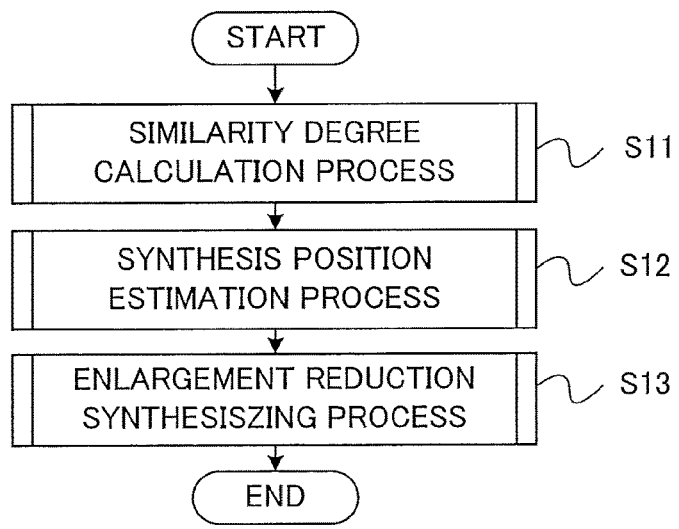
FIG. 15 is a flowchart schematically illustrating an example of processing (an image reading method according to the second embodiment) executed by a computation device of the image reading apparatus according to the second embodiment.

FIG. 15 is a flowchart schematically illustrating an example of processing executed by the computation device 5 of the image reading apparatus 1a according to the second embodiment. As illustrated in FIG. 15, first, the processor 51 executes similarity degree calculation process (step S11). This process is a process similar to the process of the similarity degree calculator 42 in FIG. 1. Next, the processor 51 executes a synthesis position estimation process (step S12). This process has the same details as those of the process of the synthesis position estimating unit 43 in FIG. 1. Lastly, the processor 51 performs magnification conversion (i.e., performs a process for enlargement, reduction, or equal magnification) on the image data stored in the RAM 52 by using a magnification based on the synthesis positions obtained at step S12, synthesizes the image data subjected to the magnification conversion, and outputs synthesized image data (step S13).

The image reading apparatus 1a according to the second embodiment can enhance quality of a read image by eliminating a loss of data at a position corresponding to a position between the adjacent sensor chips. In the second embodiment, aspects except those described above are the same as those described in the first embodiment.

<3> Third Embodiment

Figure 17:
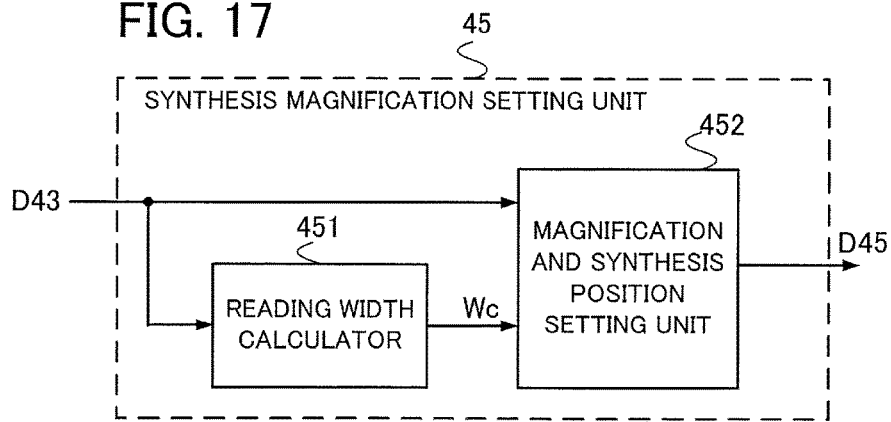
FIG. 17 is a block diagram illustrating a configuration example of a synthesis magnification setting unit in the synthesizing unit of the image reading apparatus according to the first embodiment.

In the image reading apparatus 1 described in the first embodiment, the synthesis magnification setting unit 45 of the synthesizing unit 44 in the image processing section 4 is configured as illustrated in FIG. 17, the reading width Wc in the main-scanning direction of each reading region (the width in the main-scanning direction between positions at both ends) is calculated from position data D43 at both ends of each cell, and the synthesis magnifications and the synthesis positions are set based on the reading width Wc and the width Wr between the synthesis reference positions Pr. However, a synthesis magnification setting unit 45b as illustrated in FIG. 18 may be used to calculate an overlap amount in reading from the position data D43 so that the synthesis magnifications and the synthesis positions are set according to the difference between the overlap amount in reading and an overlap amount corresponding to the synthesis reference positions Pr (referred to as a reference overlap amount).

<3-1> Configuration of Third Embodiment

Figure 18:
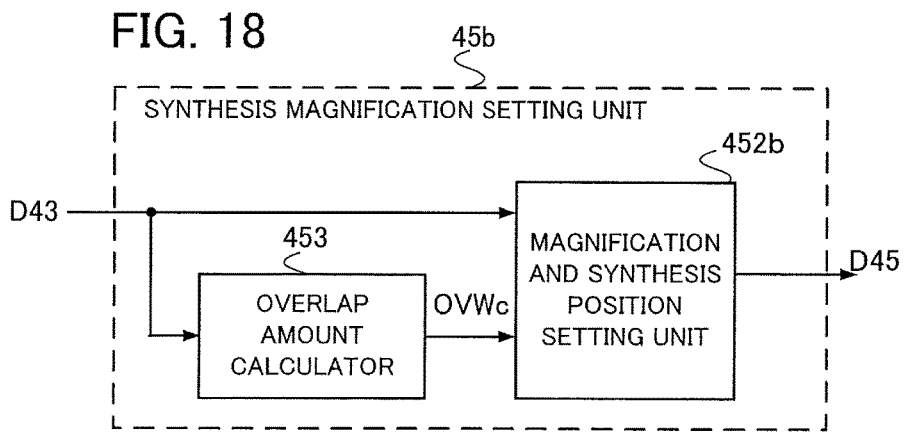
FIG. 18 is a block diagram illustrating a configuration example of a synthesis magnification setting unit in a synthesizing unit in an image reading apparatus according to a third embodiment.

FIG. 18 is a block diagram illustrating a configuration of the synthesis magnification setting unit 45b that is used instead of the synthesis magnification setting unit 45 in the synthesizing unit 44 (FIG. 16), in the image processing section 4 in the image reading apparatus 3 according to the third embodiment. In FIG. 18, constitutional elements that are the same as or correspond to those described in the first embodiment with reference to FIGS. 1, 16, and 17 are designated by the same reference characters as those in the first embodiment.

In FIG. 18, the synthesis magnification setting unit 45b of the synthesizing unit 44 in the image processing section 4 according to the third embodiment includes an overlap amount calculator 453 and a magnification and synthesis position setting unit 452b. The other part of the configuration and operation in the image processing section 4 and the synthesizing unit 44 are the same as the configuration and operation described in the first embodiment, and detailed description thereof will be omitted.

The synthesizing unit 44 (FIG. 16) sets the synthesis magnifications and the synthesis positions in the main-scanning direction of image data of reading ranges from a positional difference between position data D43 supplied from the synthesis position estimating unit 43 and the synthesis reference positions Pr in the overlap regions, performs magnification conversion on images by using the synthesis magnifications, and combines images of the overlap regions based on the synthesis positions, thereby generating and outputting the synthesized image data D44. Here, the synthesis reference positions Pr in the overlap regions are set according to the positions of the overlap regions OV2 at the reference position P, and a width (also referred to as a reference overlap amount) OVWr in the main-scanning direction of the overlap regions OV2 is also a predetermined value that is previously set by a user operation or the like (not shown in the drawings).

The synthesis magnification setting unit 45b in the synthesizing unit 44 calculates the width OVWc (a synthesis overlap amount) in the main-scanning direction of the overlap region from the position data D43 supplied from the synthesis positions estimating unit 43, sets the synthesis magnifications and the synthesis positions in the main-scanning direction of the image data of the reading ranges based on a difference between the width OVWc and the reference overlap amount OVWr at the reference position P based on the synthesis reference positions Pr (i.e., a positional difference between the synthesis positions in the reading regions from the reference positions), and outputs the synthesis magnification position data D45 indicating the synthesis magnifications and the synthesis positions.

In FIG. 18, the overlap amount calculator 453 in the synthesis magnification setting unit 45b calculates the width (the synthesis overlap amount) OVWc in the main-scanning direction of the overlap region at both ends of the reading region read by each of the cells that actually overlap, from the position data D43 supplied from the synthesis position estimating unit 43. At this time, two synthesis overlap amounts OVWc1 and OVWc2 at both ends in each reading region are calculated, and the synthesis overlap amounts OVWc include the overlap amounts OVWc1 and OVWc2. The synthesis overlap amounts OVWc (OVWc1, OVWc2) can be calculated from positions on the reading regions of the position data D43 obtained in the overlap regions at both ends of the image data of the reading region. For example, in the case of obtaining the position data D43 as a center position of the overlap regions, the position indicated by the position data D43 is converted to a distance (position) in the main-scanning direction from an end of the reading region read by each of the cells so that the distance is calculated as a synthesis overlap amount.

The magnification and synthesis position setting unit 452b in the synthesis magnification setting unit 45b sets the synthesis magnifications from a difference between the synthesis overlap amount OVWc supplied from the overlap amount calculator 453 and the reference overlap amount OVWr at the reference position P based on the synthesis reference positions Pr (i.e., a positional difference between the synthesis positions of the reading regions and the reference position), obtains the position data D43 from the synthesis position estimating unit 43 as positions of synthesis (synthesis positions) converted (moved) by using the set synthesis magnifications, and outputs the obtained positions as the synthesis magnification position data D45 indicating the synthesis magnifications and the synthesis positions. For the synthesis overlap amounts OVWc, since the two overlap amounts OVWc1 and OVWc2 at both ends of the reading region are calculated, two conversion magnifications are obtained from ratios between the overlap amounts and the reference overlap amount OVWr, and from an average value of the two conversion magnifications at the both ends, the synthesis magnifications of the reading region in the cell is obtained.

In the foregoing description, the synthesis magnifications of the reading regions of the cells are obtained from the average values of the two conversion magnifications at both ends. However, a magnification may be obtained at each position in the main-scanning direction in each reading range so that the magnification linearly changes between the two conversion magnifications at both ends, or the minimum value or the maximum value of the two conversion magnifications at both ends may be set as a magnification in the cell. In this manner, if the magnifications can be set according to the two overlap amounts OVWc1 and OVWc2 and the reference overlap amount OVWr, similar effects can be obtained.

From the synthesis magnification position data D45 output from the magnification and synthesis position setting unit 452b in the synthesis magnification setting unit 45b, the image converter 442 of the synthesizing unit 44 performs magnification conversion on images of reading region read by each of the cells of image data DI stored in the image memory 41, and corrects magnifications of the image data of the reading ranges corresponding to the sensor chips. The overlap region connecting unit 443 combines images of the overlap regions of the magnification-converted image data D442 whose magnifications have been corrected, and thereby generates and outputs the synthesized image data D44.

<3-2> Operation of Third Embodiment

<Operations of Synthesizing Unit 44 and Synthesis Magnification Setting Unit 45b>

Operations of the synthesizing unit 44 and the synthesis magnification setting unit 45b, mainly an operation of the synthesis magnification setting unit 45b, will be described. In operations of the synthesizing unit 44 and the synthesis magnification setting unit 45b in a case where the document 26 is at the reference position P, as illustrated in FIGS. 11A to 11C, the synthesis positions Pc indicated by the position data D43 coincide with the synthesis reference positions Pr on the overlap regions, and thus, the two synthesis overlap amounts OVWc1 and OVWc2 coincide with the reference overlap amount OVWr (i.e., OVWc1, OVWc2=OVWr). Thus, the overlap amount calculator 453 of the synthesis magnification setting unit 45b in the synthesizing unit 44 calculates the synthesis overlap amounts OVWc, and the magnification and synthesis position setting unit 452b sets the synthesis magnifications at, for example, OVWc/OVWr=1 from the synthesis overlap amounts OVWc supplied from the overlap amount calculator 453 and the reference overlap amount OVWr, and the synthesis positions Pc remain at the same synthesis positions. The image converter 442 performs magnification conversion on the image data DI at the synthesis magnifications of 1 (equal magnification) to correct the magnifications of the image data, combines the images of the overlap regions, and thereby generates and outputs the synthesized image data D44.

Thus, in the case of FIGS. 11A to 11C, the synthesizing unit 44 performs neither enlargement nor reduction on the image data illustrated in FIG. 11A, and using image data of the equal magnification illustrated in FIG. 11B, and synthesizes the image data as illustrated in FIG. 11C. In the synthesis, the synthesizing unit 44 performs weighting addition on the images of the adjacent overlap regions to thereby output bonded synthesized image data D44.

FIGS. 19A to 19C are diagrams for explaining operations of the synthesizing unit 44 and the synthesis magnification setting unit 45b in a case where the document 26 is at a position of (reference position−d) mm (the case of FIGS. 5A and 5B and FIGS. 6A to 6C). FIGS. 19A to 19C show operations that are similar to those in the case of FIGS. 12A to 12C, but are different in obtaining the synthesis magnifications and the synthesis positions from not the reading width Wc but the synthesis overlap amounts OVWc (OVWc1, OVWc2) at both ends of the reading region read by each of the cells. FIG. 19A illustrates the image data D41 read out from the image memory 41. FIG. 19B illustrates the image data obtained by performing magnification conversion (reduction in FIGS. 19A to 19C) on the image data D41 in the x axis direction (the direction of arrangement of the image pickup elements, the direction of arrangement of the plurality of sensor chips 21) by using the synthesis magnifications in the synthesis magnification position data D45 supplied from the synthesis magnification setting unit 45b in the synthesizing unit 44. FIG. 19C illustrates the synthesized image data D44 obtained by synthesizing the image data illustrated in FIG. 19B (combining the image data at synthesis positions by the synthesis magnification position data D45 based on the synthesis positions Pc).

In a manner similar to those of FIGS. 6A to 6C and FIGS. 12A to 12C, FIGS. 19A to 19C illustrate the case where the document 26 is at a position of (reference position −d) mm, and thus, the illustrated synthesis positions Pc indicated by the position data D43 calculated by the synthesis position estimating unit 43 do not coincide with the synthesis reference positions Pr on the overlap regions, and the synthesis positions Pc are outside the synthesis reference positions Pr. Since the synthesis positions Pc indicated by the calculated position data D43 are outside the synthesis reference positions Pr, the two overlap amounts OVWc1 and OVWc2 are smaller than the reference overlap amount OVWr (i.e., OVWc1<OVWr, OVWc2<OVWr). Thus, the overlap amount calculator 453 of the synthesis magnification setting unit 45b in the synthesizing unit 44 calculates the synthesis overlap amounts OVWc (OVWc1, OVWc2). Based on the synthesis overlap amounts OVWc supplied from the overlap amount calculator 453 and the reference overlap amount OVWr, the magnification and synthesis position setting unit 452b sets two conversion magnifications at both ends at an OVWc1/OVWr magnification and an OVWc1/OVWr magnification (values indicating a reduction magnification less than 1), sets the synthesis magnifications OVWc/OVWr in the reading region read by each of the cells from an average value of the two conversion magnifications at both ends, and converts the synthesis positions Pc to positions obtained by the magnification conversion. Then, the image converter 442 performs magnification conversion on the image data DI at the synthesis magnifications of OVWc/OVWr, corrects the magnifications of the image data, combines the images of the overlap regions, and thereby generates and outputs the synthesized image data D44.

From the above description, in the case of FIGS. 19A to 19C, the synthesizing unit 44 reduces in size the image data illustrated in FIG. 19A, and makes the synthesis positions Pc coincide with the synthesis reference positions Pr as illustrated in FIG. 19B. As a reduction magnification, an OVWc/OVWr magnification can be used, for example. Thereafter, as illustrated in FIG. 19C, the synthesizing unit 44 synthesizes the image data by using the image data illustrated in FIG. 19B. In the synthesis, the synthesizing unit 44 performs weighting addition on images of the adjacent overlap regions to thereby output bonded synthesized image data D44.

FIGS. 20A to 20C are diagrams for explaining operations of the synthesizing unit 44 and the synthesis magnification setting unit 45b in a case where the document 26 is at a position of (reference position+d) mm (the case of FIGS. 7A and 7B and FIGS. 8A to 8C). FIGS. 20A to 20C show operations that are similar to those in the case of FIGS. 13A to 13C, but are different in obtaining the synthesis magnifications and the synthesis positions from not the reading width Wc but the synthesis overlap amounts OVWc (OVWc1, OVWc2) at both ends. FIG. 20A illustrates the image data D41 read out from the image memory 41. FIG. 20B illustrates the image data obtained by performing magnification conversion (enlargement in FIGS. 20A to 20C) on the image data D41 in the x axis direction (the direction of arrangement of the image pickup elements, the direction of arrangement of the plurality of sensor chips 21) by using the synthesis magnifications in the synthesis magnification position data D45 supplied from the synthesis magnification setting unit 45b in the synthesizing unit 44. FIG. 20C illustrates the synthesized image data D44 obtained by synthesizing the image data illustrated in FIG. 20B (combining the image data at synthesis positions by the synthesis magnification position data D45 based on the synthesis positions Pc).

In a manner similar to those of FIGS. 8A to 8C and FIGS. 13A to 13C, FIGS. 20A to 20C illustrate the case where the document 26 is at a position of (reference position+d) mm, and thus, the illustrated synthesis positions Pc indicated by the position data D43 calculated by the synthesis position estimating unit 43 do not coincide with the synthesis reference positions Pr on the overlap regions, and the synthesis positions Pc are inside the synthesis reference positions Pr. Since the synthesis positions Pc indicated by the calculated position data D43 are inside the synthesis reference positions Pr, the two overlap amounts OVWc1 and OVWc2 are larger than the reference overlap amount OVWr (i.e., OVWc1>OVWr, OVWc2>OVWr). Thus, the overlap amount calculator 453 of the synthesis magnification setting unit 45b in the synthesizing unit 44 calculates the synthesis overlap amounts OVWc (OVWc1, OVWc2). Based on the synthesis overlap amounts OVWc supplied from the overlap amount calculator 453 and the reference overlap amount OVWr, the magnification and synthesis position setting unit 452b sets two conversion magnifications at both ends at an OVWc1/OVWr magnification and an OVWc2/OVWr magnification (value indicating an enlargement magnification greater than 1), sets the synthesis magnification OVWc/OVWr in the reading region read by each of the cells from an average value of the two conversion magnifications at both ends, and converts the synthesis positions Pc to positions obtained by the magnification conversion. Then, the image converter 442 performs magnification conversion on the image data DI at the synthesis magnifications of OVWc/OVWr, corrects the magnifications of the image data, combines images of the overlap regions, and generates and outputs the synthesized image data D44.

From the above description, in the case of FIGS. 20A to 20C, the synthesizing unit 44 enlarges the image data illustrated in FIG. 20A, and makes the synthesis positions Pc coincide with the synthesis reference positions Pr as illustrated in FIG. 20B. As an enlargement magnification, an OVWc/OVWr magnification can be used, for example. Thereafter, as illustrated in FIG. 20C, the synthesizing unit 44 synthesizes the image data by using the image data illustrated in FIG. 20B. In the synthesis, the synthesizing unit 44 performs weighting addition on the images of the adjacent overlap regions to thereby output bonded synthesized image data D44.

With respect to the synthesis overlap amounts OVWc1 and OVWc2 at both ends of the reading region illustrated in FIGS. 19A to 19C and FIGS. 20A to 20C, even in such a case that one of the synthesis overlap amounts OVWc1 and OVWc2 is reduced or enlarged and the other is calculated at a different magnification, since the magnification and synthesis position setting unit 452b sets the synthesis magnifications OVWc/OVWr in the reading region read by each of the cells from the average value of two conversion magnifications, magnifications that do not cause a large distortion can be set.

<3-3> Effect of Third Embodiment

As described above, in the image reading apparatus 1 according to the third embodiment, the synthesis magnification setting unit 45b calculates the synthesis overlap amounts in reading from the position data D43, and sets the synthesis magnifications and the synthesis positions from the difference between the synthesis overlap amounts and the reference overlap amount. Thus, by performing magnification conversion (equal magnification, enlargement, or reduction) in the x axis direction on the image data and synthesizing the image data obtained by the magnification conversion, even when the distance from the reference position P to the document 26 changes, a joint between adjacent images (a synthesis position) can be made inconspicuous. Consequently, quality of a read image can be enhanced without a loss of data at a position corresponding to a position between adjacent sensor chips.

The image reading apparatus 1 according to the third embodiment may be implemented by a computer program that is executed by the microprocessor in the computation device 5 of the image reading apparatus 1a according to the second embodiment. In this case, effects similar to those described above can be obtained.

INDUSTRIAL APPLICABILITY

The present invention is applicable to a copying machine, a facsimile, a scanner, and so forth that have the function of scanning a reading object such as a document to obtain image information.

DESCRIPTION OF REFERENCE CHARACTERS

1, 1a image reading apparatus; 2 image pickup unit; 3 A-D converter; 4 image processing section; 5 computation device; 6 conveyance section; 21, 21(k) sensor chip; 22, 22(k) lens; 23 diaphragm; 23a aperture; 24, 24(k) lens; glass surface; 26 document (reading object); 27 illumination; 28, 28(k) range of light travelling from document to image pickup unit; 29, 29(k) range of light travelling from document toward image pickup unit; 2A, 2A(k) reading range; 41 image memory; 42 similarity degree calculator; 43 synthesis position estimating unit; 44 synthesizing unit; 51 processor; 52 RAM; 53 nonvolatile memory; 54 mass-storage unit; 211, 212, 213 image pickup element; L1, L2, L3 width of overlap region; OV1(k−1, R) overlap region at the right of (k−1)th image data; OV1(k, L) overlap region at the left of k-th image data; P reference position; Pc synthesis position; Pr synthesis reference position; x main-scanning direction; y sub-scanning direction (document conveyance direction); 45, 45b synthesis magnification setting unit; 442 image converter; 443 overlap region connecting unit; 451 reading width calculator; 452, 452b magnification and synthesis position setting unit; 453 overlap amount calculator.

What is claimed is:

1. An image reading apparatus comprising:
    N sensor chips arranged in a first direction, N being an integer of two or more, each of the N sensor chips including a plurality of image pickup elements arranged in the first direction;
    N optical systems that respectively form, on the N sensor chips, reduced-size images of N reading ranges arranged in the first direction on a document so as to form overlap regions that are regions where parts of regions in ends of adjacent reading ranges of the N reading ranges overlap each other; and
    an image processing section that
    uses image data in the overlap regions of image data of the N reading ranges arranged in the first direction, thereby obtaining positions of the overlap regions having a highest correlation of the adjacent reading ranges of the N reading ranges,
    obtains, based on the positions and predetermined synthesis reference positions in the overlap regions, magnifications of read images and synthesis positions that indicate positions where two pieces of the image data are combined,
    performs image processing of correcting the magnifications in the first direction of the image data of the N reading ranges, and
    combines the image data of the N reading ranges subjected to the image processing, thereby generating synthesized image data.

2. The image reading apparatus of claim 1, wherein:
    the N optical systems that respectively form, on the N sensor chips, reduced-size images of the N reading ranges arranged in the first direction are arranged so as to form the overlap regions that are regions where the parts of regions in the ends of the adjacent reading ranges overlap each other; and
    each of the N optical systems includes
    a first lens that optically reduces light reflected on the document,
    a diaphragm through which part of the light reduced by the first lens passes, and
    a second lens that forms an image on one of the N sensor chips from the light that has passed through the diaphragm.

3. The image reading apparatus of claim 1, wherein:
    the image processing section includes
    a similarity degree calculator that uses the image data of the overlap regions that are the regions where the adjacent reading ranges of image data of the N reading ranges overlap each other, the image data of the overlap regions being image data generated by the N sensor chips, and thereby calculates a similarity degree indicating a degree of similarity that is a degree of correlation between image data of matching regions set in the overlap regions,
    a synthesis position estimating unit that estimates the synthesis positions at which two pieces of image data of the adjacent reading ranges are combined, from the similarity degree calculated by the similarity degree calculator, and
    a synthesizing unit that, based on the synthesis positions estimated by the synthesis position estimating unit, sets the magnifications of the reading ranges and the synthesis positions for the image data of the N reading ranges, converts widths in the first direction of the image data of the N reading ranges, and synthesizes the two pieces of image data having the converted widths, thereby generating the synthesized image data.

4. The image reading apparatus of claim 3, wherein the similarity degree is a value based on a sum of differential absolute values of pixels in the matching regions set in the overlap regions, and the similarity degree increases as the sum of differential absolute values decreases.

5. The image reading apparatus of claim 3, wherein the similarity degree is a value based on a sum of squares of differential absolute values of pixels in the matching regions set in the overlap regions, and the similarity degree increases as the sum of squares of differential absolute values decreases.

6. The image reading apparatus of claim 3, wherein:
    the synthesizing unit includes
    a synthesis magnification setting unit that sets the synthesis magnifications for each of the image data of the N reading ranges, based on the synthesis positions estimated by the synthesis position estimating unit and the predetermined synthesis reference position, and outputs the synthesis magnifications and synthesis connection positions,
    an image converter that converts the widths in the first direction of the image data of the N reading ranges by using the synthesis magnifications set by the synthesis magnification setting unit, and
    an overlap region connecting unit that synthesizes the image data having the widths converted by the image converter while making the synthesis connection positions set by the synthesis magnifications setting unit coincide with each other, thereby generating the synthesized image data.

7. The image reading apparatus of claim 6, wherein:
the synthesis magnification setting unit includes, with respect to each of the image data of the N reading ranges,
a reading width calculator that obtains, from the synthesis positions estimated by the synthesis position estimating unit, a synthesis reading width from a width in the first direction between a synthesis position at an end in the first direction and a synthesis position at another end, and
a magnification and synthesis position setting unit that calculates the synthesis magnifications from the width in the first direction between the ends based on the predetermined synthesis reference position in a reading range and the synthesis reading width supplied from the reading width calculator, and obtains the synthesis positions estimated by the synthesis position estimating unit as a synthesis connection position in conversion by using the synthesis magnifications, thereby setting the synthesis magnifications and the synthesis connection position.

8. The image reading apparatus of claim 7, wherein:
the magnification and synthesis position setting unit
sets the synthesis magnifications and the synthesis connection position from a ratio between the synthesis reading width supplied from the reading width calculator and the width of the reading range based on the predetermined synthesis reference position,
sets the synthesis magnifications at 1 if a synthesis position at one end and a synthesis position at another end in the first direction in each of the image data of the N reading ranges coincide with the predetermined synthesis reference positions in the corresponding one of the image data of the N reading ranges and the synthesis reading width supplied from the reading width calculator is equal to the width of the reading range based on the predetermined synthesis reference position,
sets the synthesis magnifications at a value less than 1 if the synthesis position at one end and the synthesis position at another end in the first direction in each of the image data of the N reading ranges are outside the predetermined synthesis reference positions in the corresponding one of the image data of the N reading ranges and the synthesis reading width supplied from the reading width calculator is larger than the width of the reading range based on the predetermined synthesis reference position, and
sets the synthesis magnifications at a value greater than 1 if the synthesis position at one end and the synthesis position at another end in the first direction in each of the image data of the N reading ranges are inside the predetermined synthesis reference positions in the corresponding one of the image data of the N reading ranges and the synthesis reading width supplied from the reading width calculator is smaller than the width of the reading range based on the predetermined synthesis reference position.

9. The image reading apparatus of claim 6, wherein:
the synthesis magnification setting unit includes
an overlap amount calculator that, for each end in the first direction of the image data of the N reading ranges, calculates a width of an overlap region in the reading range from the synthesis positions estimated by the synthesis position estimating unit, and obtains a synthesis overlap amount, and
a magnification and synthesis position setting unit that calculates the synthesis magnifications in the N reading ranges from the synthesis overlap amount at each end of the reading range supplied from the overlap amount calculator and an overlap amount at the predetermined synthesis reference position of reading range, obtains the synthesis positions estimated by the synthesis position estimating unit as a synthesis connection position in conversion by using the synthesis magnifications, and sets the synthesis magnifications and the synthesis connection positions.

10. The image reading apparatus of claim 9, wherein:
the magnification and synthesis position setting unit
sets the synthesis magnifications and the synthesis connection position from a ratio between the synthesis overlap amount supplied from the overlap amount calculator and an overlap amount based on the predetermined synthesis reference position,
sets the synthesis magnifications at 1 if a synthesis overlap amount at one end in the first direction in each of the image data of the N reading ranges is equal to an overlap amount at the predetermined synthesis reference position,
sets the synthesis magnifications at a value less than 1 if the synthesis overlap amount at one end in the first direction in each of the image data of the N reading ranges is smaller than the overlap amount at the predetermined synthesis reference position, and
sets the synthesis magnifications at a value greater than 1 if the synthesis overlap amount at one end in the first direction in the image data of the N reading ranges is larger than the overlap amount at the predetermined synthesis reference position.

11. An image reading method that is executed by an image reading device including
N sensor chips arranged in a first direction, N being an integer of two or more, each of the N sensor chips including a plurality of image pickup elements arranged in the first direction; and
N optical systems that respectively form, on the N sensor chips, reduced-size images of N reading ranges arranged in the first direction on a document so as to form overlap regions that are regions where parts of regions in ends of adjacent reading ranges of the N reading ranges overlap each other;
the image reading method comprising the steps of:
using image data in the overlap regions of image data of the N reading ranges arranged in the first direction, thereby obtaining positions of the overlap regions having a highest correlation of the adjacent reading ranges of the N reading ranges,
obtaining, based on the positions and predetermined synthesis reference positions in the overlap regions, magnifications of read images and synthesis positions that indicate positions where two pieces of the image data are combined, and
performing image processing of correcting the magnifications in the first direction of image data of the N reading ranges, and combining the image data of the N reading ranges subjected to the image processing, thereby generating synthesized image data.

* * * * *